US006367391B1

(12) United States Patent
Thoman et al.

(10) Patent No.: US 6,367,391 B1
(45) Date of Patent: *Apr. 9, 2002

(54) RAILWAY CAR WITH COMPOSITE BOX STRUCTURE FORMED FROM MOLDED COMPONENTS

(75) Inventors: Mell R. Thoman, Carrollton; Stephen W. Smith, Dallas, both of TX (US)

(73) Assignee: TRN Business Trust, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/309,063

(22) Filed: May 10, 1999

Related U.S. Application Data

(63) Continuation-in-part of application No. 09/020,372, filed on Feb. 9, 1998, now Pat. No. 6,138,580, and a continuation-in-part of application No. 09/020,365, filed on Feb. 9, 1998, now Pat. No. 6,092,472, which is a continuation-in-part of application No. 08/684,564, filed on Jul. 19, 1996, now Pat. No. 5,857,414.
(60) Provisional application No. 60/109,848, filed on Nov. 25, 1998, and provisional application No. 60/085,419, filed on May 13, 1998.

(51) Int. Cl.$^7$ ............................................... B61D 17/00
(52) U.S. Cl. ....................................................... 105/404
(58) Field of Search ............................. 105/238.1, 355, 105/396, 404, 409

(56) References Cited

U.S. PATENT DOCUMENTS

| | | | |
|---|---|---|---|
| 2,783,718 A | 3/1957 | Cheshire | 105/419 |
| 2,926,928 A | 3/1960 | Bennett | 280/106 |
| 3,116,950 A | 1/1964 | Chieger et al. | 296/24 |
| 3,163,461 A | 12/1964 | Troy | 296/28 |
| 3,266,441 A | 8/1966 | Pulcrano | 105/416 |
| 3,319,393 A | 5/1967 | Tantlinger et al. | 52/496 |
| 4,091,743 A | 5/1978 | Lemon | 105/375 |
| 4,671,562 A | 6/1987 | Broadbent | 296/181 |
| 4,787,669 A | 11/1988 | Wante | 296/182 |
| 4,902,215 A | 2/1990 | Seamann, III | 425/406 |
| 5,052,906 A | 10/1991 | Seemann | 425/112 |

(List continued on next page.)

OTHER PUBLICATIONS

Compliant filed Nov. 12, 1999 re Civil Action No. 99–783 RRM in the United States District Court for the District of Delaware, *True North Composites*, LLC v Trinity Industries, Inc.
Answer filed Dec. 16, 1999 re Civil Action No. 99–783 RRM in the United States District Court for the District of Delaware, *True North Composites*, LLC v Trinity Industries, Inc.

*Primary Examiner*—S. Joseph Morano
*Assistant Examiner*—Robert J. McCarry, Jr.
(74) *Attorney, Agent, or Firm*—Baker Botts L.L.P.

(57) ABSTRACT

A composite box structure is formed from individually manufactured components such as a pair of endwalls, a pair of sidewalls, a floor and a roof. One or more components preferably include a core encapsulated in multiple layers of fiber reinforced plastic. The core may be formed from various materials which provide improved resistance to heat transfer between the interior and the exterior of the composite box structure. The composite box structure may include one or more components manufactured at least in part from steel alloys, aluminum alloys, wood and/or other materials associated with conventional railway boxcars. An opening is provided in each sidewall to allow access to the interior of the composite box structure. An opening may be formed in one of the endwalls of the composite box structure to allow installation of a temperature control system. An airflow management system may also be incorporated into selected interior portions of the roof, sidewalls, endwalls, and floor. The individual components may be mounted on a railway car underframe and connected with each other to form a box structure for various types of railway cars such as a railway boxcar or a temperature controlled railway car.

30 Claims, 10 Drawing Sheets

U.S. PATENT DOCUMENTS

| | | | |
|---|---|---|---|
| 5,316,462 A | 5/1994 | Seemann | 425/112 |
| 5,320,046 A | 6/1994 | Hesch | 105/413 |
| 5,351,990 A | 10/1994 | Thomas | 280/789 |
| 5,370,482 A | 12/1994 | Long | 410/153 |
| 5,386,674 A | 2/1995 | Sfirakis et al. | 52/243 |
| 5,403,062 A | 4/1995 | Sjostedt et al. | 296/181 |
| 5,403,063 A | 4/1995 | Sjostedt et al. | 296/187 |
| 5,449,081 A | 9/1995 | Sjostedt et al. | 220/1.5 |
| 5,613,726 A | 3/1997 | Hobbs et al. | 296/181 |
| 5,678,715 A | 10/1997 | Sjostedt et al. | 220/1.5 |
| 5,702,151 A | 12/1997 | Grote et al. | 296/187 |
| 5,741,042 A | 4/1998 | Livingston et al. | 296/187 |
| 5,765,485 A * | 6/1998 | Thoman et al. | 105/404 |
| 5,791,714 A | 8/1998 | Hall, Jr. | 296/24.2 |
| 5,791,726 A | 8/1998 | Kaufman | 296/181 |
| 5,802,984 A | 9/1998 | Thoman et al. | 105/404 |
| 5,855,174 A | 1/1999 | Thoman et al. | 105/413 |
| 5,857,414 A * | 1/1999 | Thoman et al. | 105/397 |
| 5,890,435 A | 4/1999 | Thoman et al. | 105/404 |
| 6,092,472 A * | 7/2000 | Thoman et al. | 105/404 |
| 6,109,684 A | 8/2000 | Reitnouer | 296/182 |
| 6,112,671 A | 9/2000 | Basile et al. | 105/422 |
| 6,138,580 A | 10/2000 | Thoman | 105/396 |

* cited by examiner

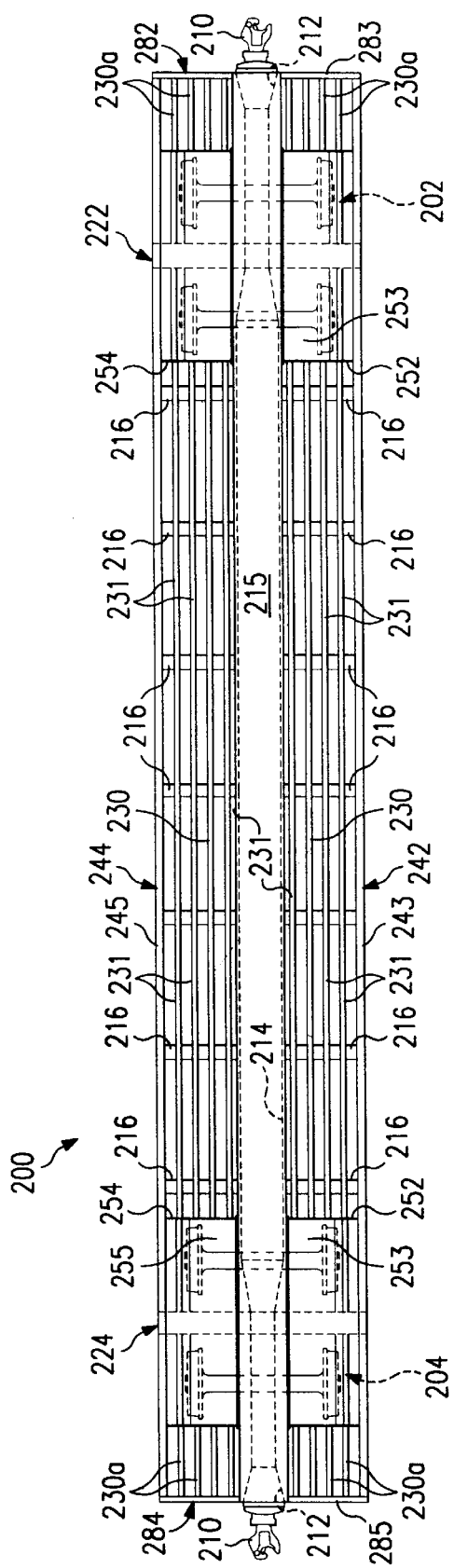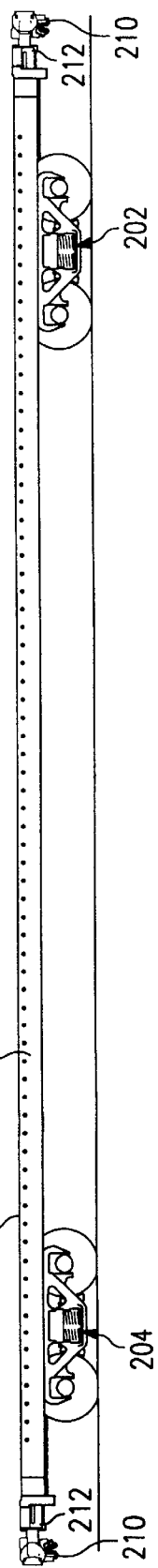
FIG. 3
FIG. 4

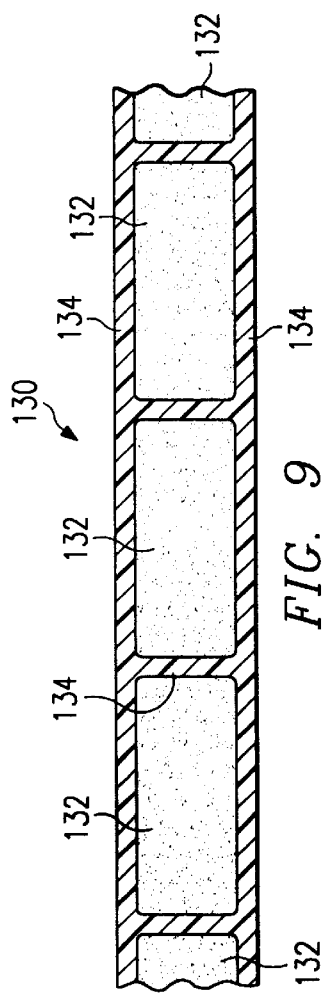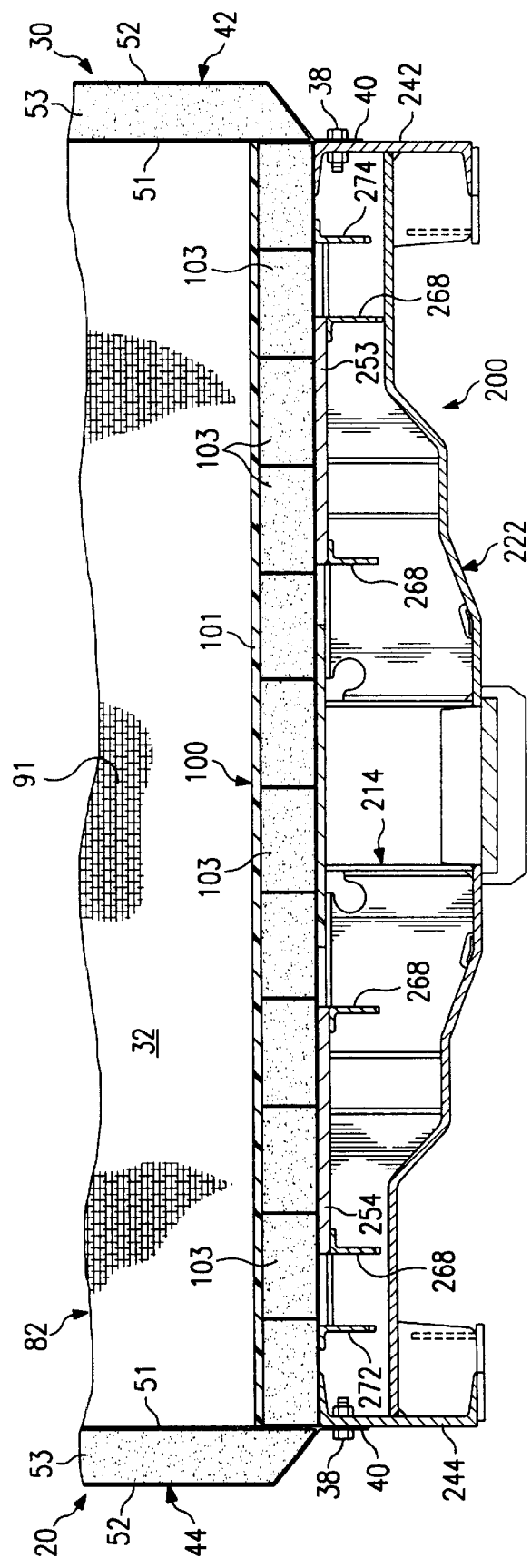

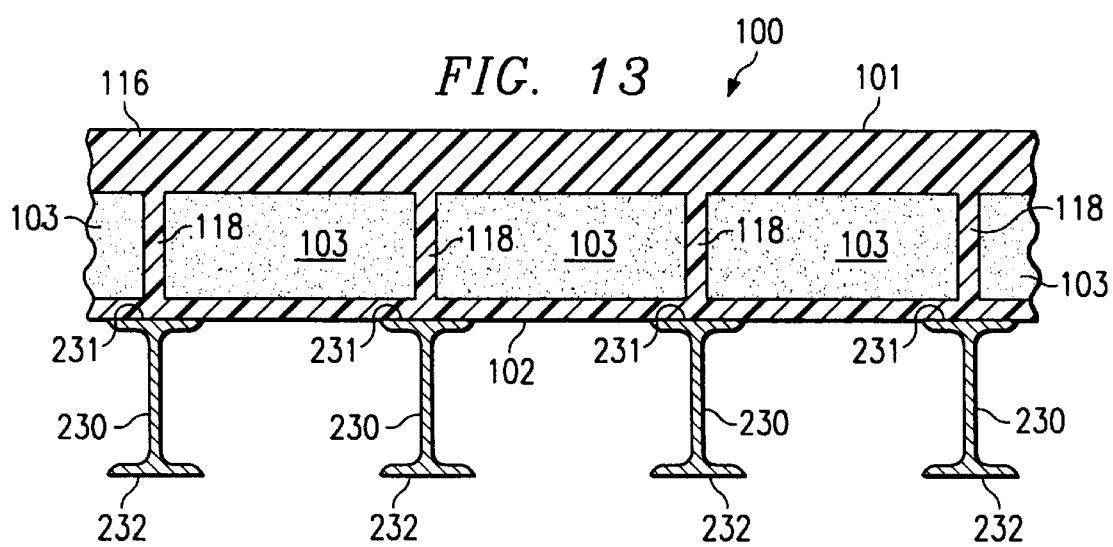
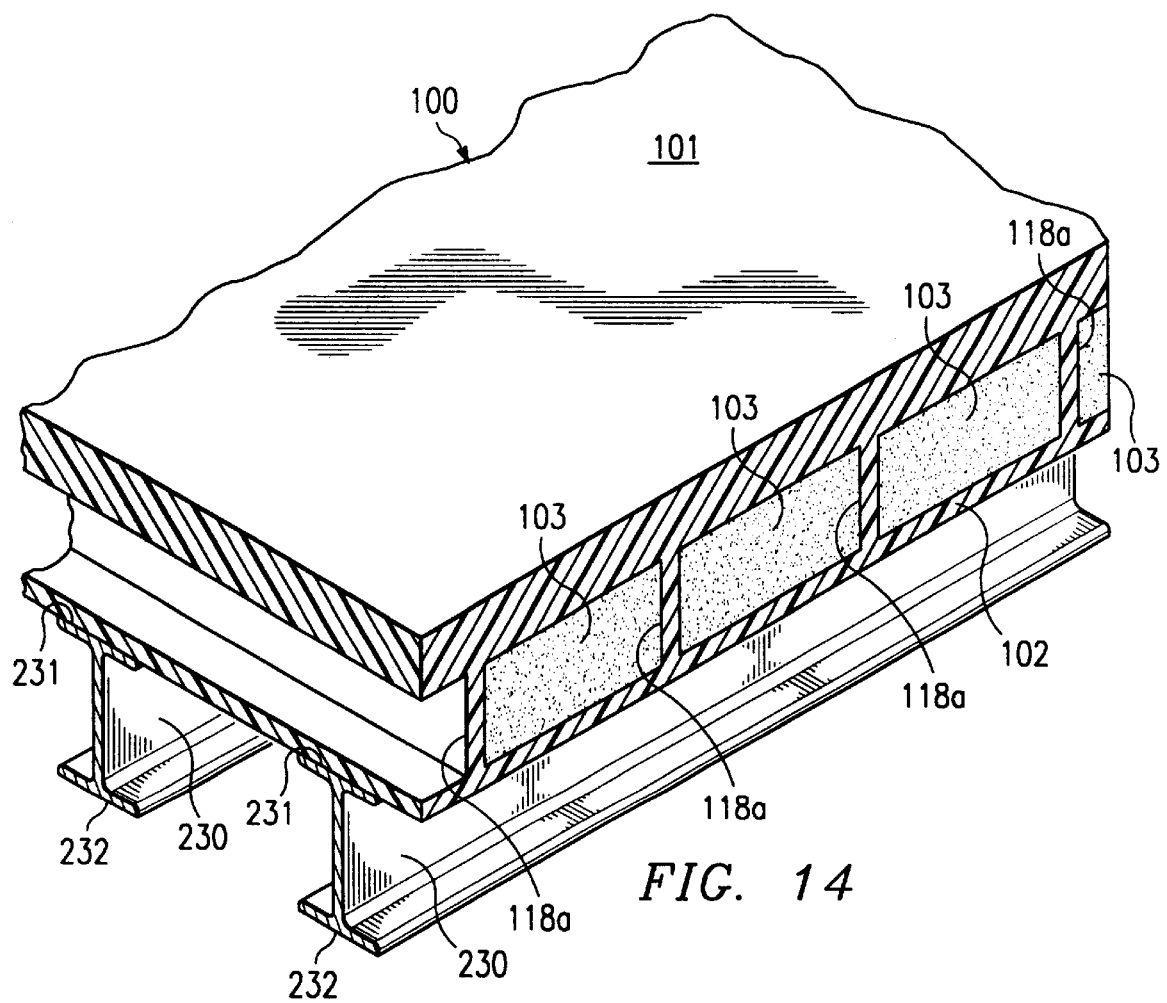

RAILWAY CAR WITH COMPOSITE BOX STRUCTURE FORMED FROM MOLDED COMPONENTS

RELATED APPLICATIONS

This application claims the benefit of provisional patent application entitled Railway Car With Composite Box Structure Formed From Molded Components, U.S. Ser. No. 60/085,419 filed May 13, 1998; and provisional patent application, same title, U.S. Ser. No. 60/109,848 filed Nov. 25, 1998.

This application is a continuation-in-part of patent application U.S. Ser. No. 09/020,372 filed Feb. 9, 1998, entitled Temperature Controlled Composite Boxcar, now U.S. Pat. No. 6,138,580; and patent application U.S. Ser. No. 09/020,365 filed Feb. 9, 1998, entitled Composite Box Structure for a Railway Car, now U.S. Pat. No. 6,092,472 (both of which were continuations-in-part of patent application U.S. Ser. No. 08/684,564 filed Jul. 19, 1996, entitled Composite Box Structure for a Railway Car, now U.S. Pat. No. 5,857,414).

This application is related to CPA application U.S. Ser. No. 08/684,345 filed Jul. 19, 1996, entitled Insulated Composite Railway Boxcar and Method, now U.S. Pat. No. 5,765,485; CPA patent application U.S. Ser. No. 08/684,537 filed Jul. 19, 1996, entitled Load Divider Assembly and Door Assembly for a Composite Railway Boxcar, now U.S. Pat. No. 5,802,984; patent application U.S. Ser. No. 08/859,671 filed May 20, 1997, entitled Insulated Composite Railway Boxcar and Method, now U.S. Pat. No. 5,890,435; patent application U.S. Ser. No. 08/859,575 filed May 20, 1997, entitled Insulated Composite Railway Boxcar and Method, now U.S. Pat. No. 5,855,174; and patent application U.S. Ser. No. 08/986,187 filed Dec. 5, 1997, entitled Railway Car Underframe for an Insulated Composite Boxcar, now U.S. Pat. No. 6,000,342.

TECHNICAL FIELD OF THE INVENTION

This invention relates generally to composite box structures which may be used in the manufacture of various types of railway cars and more particularly to composite box structures formed from individually molded components.

BACKGROUND OF THE INVENTION

Over the years, general purpose railway boxcars have progressed from relatively simple wooden structures mounted on flat cars to more elaborate arrangements including insulated walls and refrigeration equipment. Various types of insulated railway boxcars are presently manufactured and used. A typical insulated railway boxcar includes an enclosed structure mounted on a railway car underframe. The enclosed structure generally has an outer shell, one or more layers of insulation and interior paneling. The outer shell of such railway boxcars often has an exterior surface formed from various types of metal such as steel or aluminum. The interior paneling is often formed from wood and/or metal as desired for the specific application. For some applications, the interior paneling has been formed from fiber reinforced plastic (FRP). Various types of sliding doors including plug type doors are generally provided on each side of conventional railway boxcars for loading and unloading freight. Conventional railway boxcars are assembled from various pieces of wood, steel and/or sheets of composite materials such as carbon fiber reinforced plastic. Significant amounts of raw material, labor and time are often required to complete the manufacture and assembly of conventional railway boxcars.

The underframe for many railway boxcars includes a center sill with a pair of end sills and a pair of side sills arranged in a generally rectangular configuration corresponding approximately with the dimensions for the floor of the railway boxcar. Cross bearers and cross ties are provided to establish the desired rigidity and strength for transmission of vertical loads from the side sills to the center sill and for dissipating horizontal end loads on the center sill to other portions of the underframe. A plurality of longitudinal stringers is also provided on each side of the center sill to support the floor of the enclosed structure. Examples of such railway car underframes are shown in U.S. Pat. Nos. 2,783,718 and 3,266,441.

For many years various techniques have been used to build fiberglass boat hulls. Many of these hulls have been fabricated using wet layup techniques in which each layer of material such as carbon fiber or carbon fiber is first wetted with the desired resin such as polyester or vinylester and then laid in an open mold. Recently, vacuum bagging techniques have been combined with wet layup techniques to control the emission of volatile organic compounds. Vacuum bagging also produces a stronger structure by eliminating air pockets and excess resin in the finished product.

More recently, vacuum bagging techniques have been combined with an enhanced resin delivery system which allows the use of a closed molding system and dry layup of core layers and fiber reinforcing layers such as carbon fiber in the mold. This process may sometimes be referred to as composite resin infusion molding. U.S. Pat. Nos. 4,902,215; 5,052,906 and 5,316,462 provide additional information concerning this type of vacuum bagging process to form a carbon fiber reinforced composite article.

Various types of load dividers and freight securing systems have previously been used to prevent undesired movement of freight contained within a railway boxcar. The use of such systems is particularly important when a railway boxcar is only partially loaded. Examples of such systems are shown in U.S. Pat. No. 5,370,482 entitled Cargo Securement System and U.S. Pat. No. 5,386,674 entitled Two Piece Bulkhead Door for Rail Cars and the Like.

SUMMARY OF THE INVENTION

In accordance with the present invention, disadvantages and problems associated with previous composite box structures used to manufacture various types of railway cars have been substantially reduced or eliminated. The present invention provides composite box structures for various types of railway cars including, but not limited to, railway boxcars and temperature controlled railway cars. The composite box structure provides enhanced insulation, reduced weight, increased load carrying capacity and increased service life as compared to conventional railway cars. A composite box structure formed from individually molded components incorporating teachings of the present invention allows manufacture and assembly of the resulting railway boxcar with substantially reduced costs as compared to conventional railway cars with the same performance characteristics and as compared to composite box structures formed by integrally molding several components as one or more composite units.

A composite box structure formed from individually molded components incorporating teachings of the present invention allows combining a temperature control system with an airflow management system to provide a temperature controlled boxcar with substantially reduced total life-time costs as compared to conventional refrigerated boxcars with substantially the same performance characteristics. The composite box structure provides enhanced insulation, reduced weight, increased load carrying capacity, better temperature regulation and increased service life as compared to a typical refrigerated boxcar.

One aspect of the present invention includes a composite box structure having a roof, sidewalls, endwalls and a floor fabricated as individual components using vacuum bagging techniques along with dry layup of selected material layers and an enhanced resin delivery system. The individual components may then be assembled with each other using adhesives and/or mechanical fasteners to form the desired composite box structure. The present invention also allows using the same individually molded component such as an endwall or a sidewall to form various types of composite box structures. Thus, increasing the utilization of the associated molding system and decreasing the unit cost for each individually molded component.

For some applications, each sidewall is preferably formed from a first section and a second section. Each section has a generally rectangular configuration. The respective first section and the second section of each sidewall are preferably spaced from each other to form an opening corresponding with the desired location of a door for the resulting railway boxcar. As a result of forming a composite box structure in accordance with teachings of the present invention, the cost and time required to complete the molding process for the individual components and assembly of the resulting composite box is substantially reduced as compared with the time and cost required to integrally mold sidewalls and endwalls with the floor and/or roof.

Another aspect of the present invention includes a box structure having a roof, sidewalls, endwalls and a floor fabricated as individual components using molding techniques to form selected components from composite materials and conventional railway car manufacturing techniques to form other selected components from wood and/or metal. For example the roof and floor of a box structure may be formed from composite materials using various types of molding techniques. The sidewalls, endwalls and/or doors may be formed from wood, steel and other materials associated with conventional railway boxcars.

BRIEF DESCRIPTION OF THE DRAWINGS

For a more complete understanding of the present invention, and the advantages thereof, reference is now made to the following written description taken in conjunction with the accompanying drawings, in which:

FIG. 3 is a schematic drawing showing a plan view of a railway car underframe satisfactory for use with a composite box structure formed in accordance with teachings of the present invention;

FIG. 4 is a schematic drawing showing a side view of the railway car underframe of FIG. 3;

FIG. 9 is a schematic drawing in section with portions broken away showing a representative example of an individually molded component which may be used to form a composite box structure in accordance with the teachings of the present invention;

FIG. 10 is a schematic drawing in section with portions broken away showing a composite box structure formed in accordance with teachings of the present invention mounted on a railway car underframe;

FIG. 13 is a schematic drawing in section with portions broken away showing the composite floor of FIG. 12 after molding with a first orientation with respect to longitudinal stringers of a railway car underframe;

FIG. 14 is a schematic drawing in section with portions broken away showing the composite floor of FIG. 12 after molding with a second orientation with respect to longitudinal stringers of a railway car underframe;

DETAILED DESCRIPTION OF THE INVENTION

Figure 1:
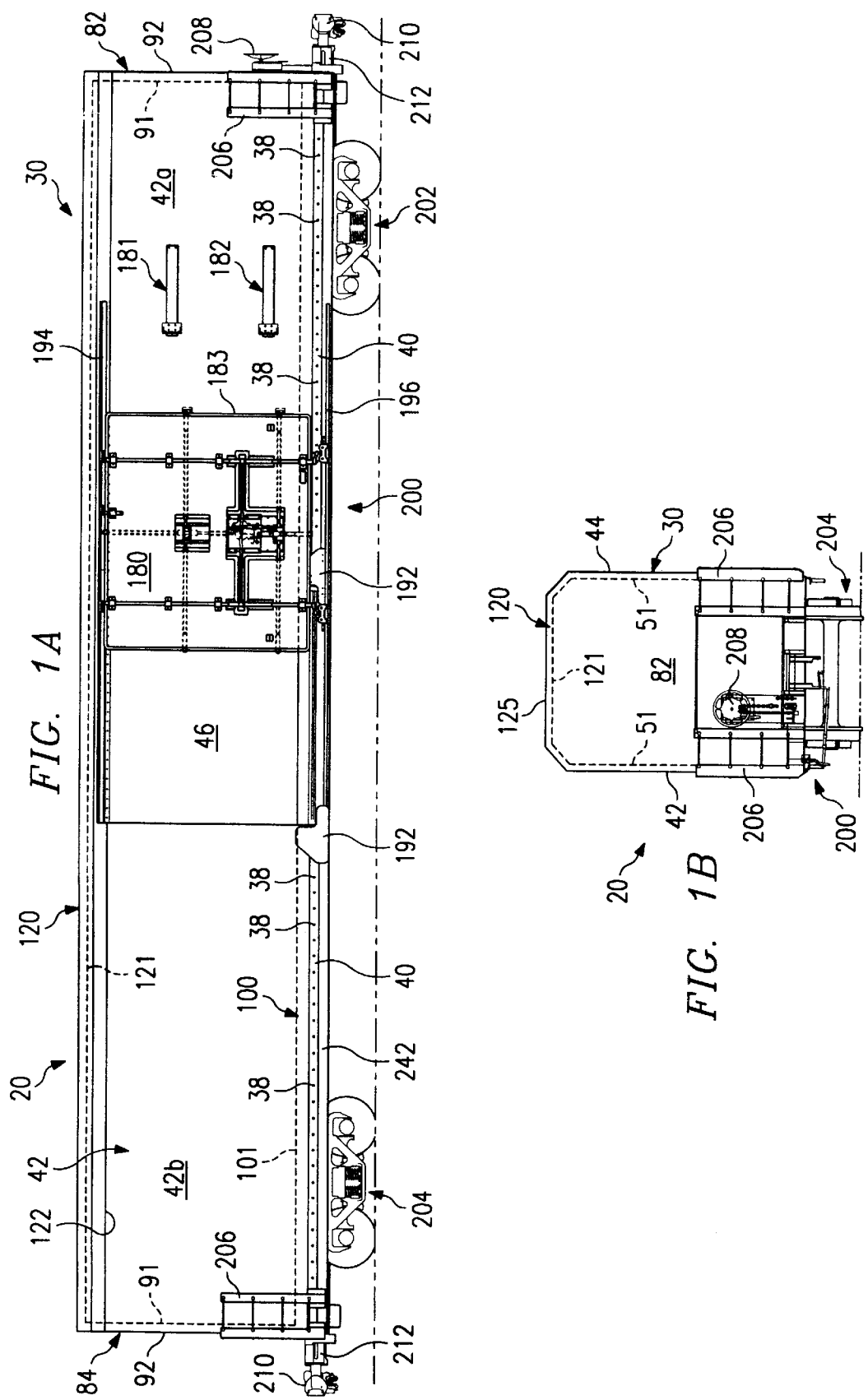
FIG. 1A is a schematic drawing in elevation showing a side view of a railway boxcar having a composite box structure incorporating an embodiment of the present invention.
FIG. 1B is an end view of the railway boxcar of FIG. 1A.
Figure 2:
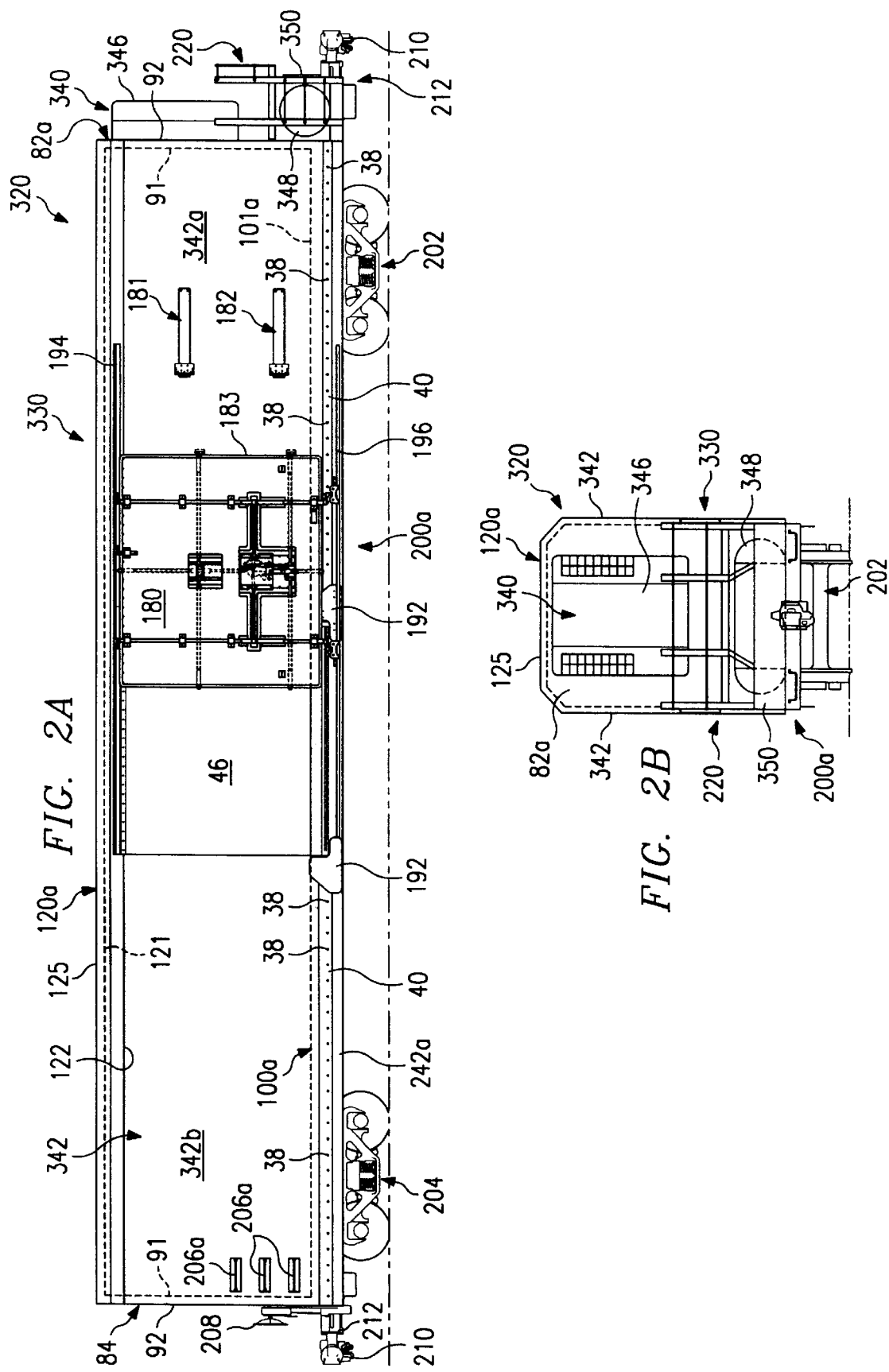
FIG. 2A is a schematic drawing in elevation showing a side view of a temperature controlled railway car having a composite box structure incorporating another embodiment of the present invention.
FIG. 2B is an end view of the temperature controlled railway car of FIG. 2A.

The preferred embodiments of the present invention and its advantages are best understood by referring to FIGS. 1A through 18 of the drawings, like numerals being used for like and corresponding parts of the various drawings.

Railway boxcar 20 incorporating teachings of the present invention is shown in FIGS. 1A and 1B with composite box structure 30 mounted on railway car underframe 200. Temperature controlled railway car 320 incorporating further teachings of the present invention is shown in FIGS. 2A and 2B with composite box structure 330 mounted on railway car underframe 200a. Railway car underframes 200 and 200a have substantially the same design and operating characteristics, except for modifications associated with the increased length of temperature controlled railway car 320 as compared to railway boxcar 20 and extra equipment associated with temperature control system 340.

As will be explained later in more detail, composite box structures 30 and 330 may be adhesively bonded and/or mechanically engaged with respective railway car underframes 200 and 200a. For some applications, only mechanical connections may be formed between composite box structures 30 and 330 and respective railway car underframes 200 and 200a. For other applications, only adhesive bonds may be formed therebetween. For still other applications, a combination of adhesive bonds and mechanical connections may be formed between composite box structures 30 and 330 and respective railway car underframes 200 and 200a.

For the embodiment of the present invention shown in FIGS. 1A and 1B, railway boxcar 20 preferably has exterior dimensions which satisfy the requirements of plate C and associated structural design requirements of the Association of American Railroads (AAR). For the embodiment of the present invention shown in FIGS. 2A and 2B, temperature controlled railway car 320 preferably has exterior dimensions which satisfy the requirements of plates C and F and associated structural design requirements of the Association of American Railroads (AAR). Forming composite box structures 30 and 330 from light weight composite materials in accordance with teachings of the present invention allows reducing the weight of railway boxcar 20 and temperature controlled railway 320 while at the same time increasing both the internal volume and load carrying capacity of railway boxcar 20 and temperature controlled railway 320 as compared to conventional insulated boxcars or refrigerated boxcars within the same AAR design requirements.

For one application, composite box structure 30 provides hollow interior 32 with dimensions of approximately sixty-eight feet in length, ten feet in width and twelve feet in height. For this application, railway boxcar 20 has a freight carrying capacity of approximately 6,291 cubic feet with a light weight of 86,000 pounds and a nominal load carrying capacity of 200,000 pounds which is very advantageous for an insulated railway boxcar satisfying the dimensional requirements of plate C. Additional specifications for railway boxcar 20 are included at the end of this written description.

For another application, composite box structure 330 provides hollow interior 332 with dimensions of approximately sixty eight to seventy two feet in length, ten feet in width and twelve feet in height. For this application, temperature controlled railway 320 has a freight carrying capacity of approximately 7,500 to 7,900 cubic feet with a light weight of approximately 98,000 pounds and a nominal load carrying capacity of 286,000 pounds which is very advantageous for a temperature controlled railway car satisfying the dimensional requirements of plates C and F. Additional specifications for temperature controlled railway car 320 are included at the end of this written description.

By forming composite box structures 30 and 330 from individually molded components, modifications may be made to only selected components required to accommodate specific customer requests concerning the size and type of freight that will be carried in the resulting railway car. Other individually molded components may be used without substantial modification to form a wide variety of composite box structures. For example, substantially the same molding system and techniques may be used to form endwalls 82 and 84 of composite box structure 30 and endwall 82 of composite box structure 330. As discussed later in more detail, a modification may be made to this molding system to form opening 334 in endwall 84a to accommodate refrigeration unit 346. For some applications one or more components may be formed from wood, steel, aluminum and other materials associated with conventional railway box cars. For example, one or more of the individual components may be formed substantially from wood, steel alloys and/or aluminum alloys.

For purposes of this patent application, the term "fiber reinforced plastic" is used to refer to composite materials composed of selected thermosetting or thermoplastic resins and fibers, filaments, or whiskers of material such as glass, metal, aramid, boron, carbon, aluminum silicate and other suitable ceramic materials. For some applications, small flakes of metal, ceramics, cermets, or other suitable materials may be dispersed within the selected resin or resins to provide additional reinforcement and strength for the resulting fiber reinforced plastic.

For purposes of this patent application, the term "resin" is used to include both naturally occurring and synthetic polymers which may be mixed with various additives such as fillers, colorants, plasticizers, and curing agents, to infuse or impregnate the selected fiber material to form the desired fiber reinforced plastic layers and surfaces during molding of the individual components associated with composite box structures 30 and 330. For one application, the fiber material preferably includes glass fibers typically associated with FIBERGLAS® products available from Owens-Corning.

Some or all of the components associated with composite box structures 30 and 330 are preferably individually molded using vacuum bagging techniques which include dry lay up of selected core materials and multiple layers of the selected fiber materials in respective closed molding systems (not shown), along with enhanced resin delivery systems (not shown). Other components associated with composite box structures 30 and 330 may be fabricated at least in part from wood, steel, aluminum and/or other materials associated with conventional railway cars. For one embodiment, the end walls and the side walls may be fabricated substantially from wood, steel alloys, aluminum alloys and/or other materials associated with conventional railway cars. The roof, floor and/or doors may be formed as individually molded components in accordance with teachings of the present invention.

Some of the benefits of using closed molding system include the ability to fabricate a large number of components from the same mold with dimensions that meet the selected AAR plate requirements and provide a generally smooth, aerodynamic exterior surface for the resulting railway boxcar 20 and temperature controlled railway car 320. As previously noted the same closed molding system may be used to produce endwalls 82 and 84 for composite box structure 30 and endwall 84 for composite structure 330.

Closed molding systems and enhanced resin delivery systems may be modified to form individual components with various configurations and dimensions as required for composite box structures 30 and 330. U.S. Pat. Nos. 4,902, 215; 5,052,906 and 5,316,462 show examples of vacuum bagging techniques satisfactory for use with the present invention. Composite resin infusion molding processes incorporating various features of these patents have been licensed to Hardcore DuPont Composites L.L.C. located at 42 Lukens Drive, New Castle, Del. Various types of composite structures molded in accordance with the teachings of these patents are available from Hardcore DuPont.

Composite box structure 30 includes a pair of opposite sidewalls 42 and 44, a pair of opposite endwalls 82 and 84, floor 100 and roof 120. Sidewalls 42 and 44 along with endwalls 82 and 84, floor 100 and roof 120 cooperate with each other to partially define hollow interior 32 of composite box structure 30. See FIG. 5. Hollow interior 32 corresponds with the interior of railway boxcar 20 in which various types of freight may be placed for shipment in railway boxcar 20. Roof 120 has dimensions corresponding with sidewalls 42 and 44 and endwalls 82 and 84 to allow attaching roof 120 with endwalls 82 and 84 and sidewalls 42 and 44 opposite from floor 100.

For purposes of illustration, line 122 is shown in FIG. 1A to represent the seam or joint between longitudinal edge 122 of roof 120 and upper edge 48 of sidewall 42. Normally, the seam or joint between roof 120 and upper edges 48 of sidewalls 42 and 44 will be sealed and covered using conventional carbon fiber fabrication techniques such that line 122 is not visible on either the interior or the exterior of composite box structure 30. Adhesive bonding around the perimeter of roof 120 will provide a strong, water tight seal between roof 120 and upper edges 48 of sidewalls 42 and 44.

Sidewalls 42 and 44, endwalls 82 and 84, floor 100 and roof 120 are preferably individually molded as separate components having generally flat, rectangular configurations. For some applications one or more of these components may be formed from wood, steel, aluminum and/or other materials associated with conventional railway boxcars.

Figure 11:
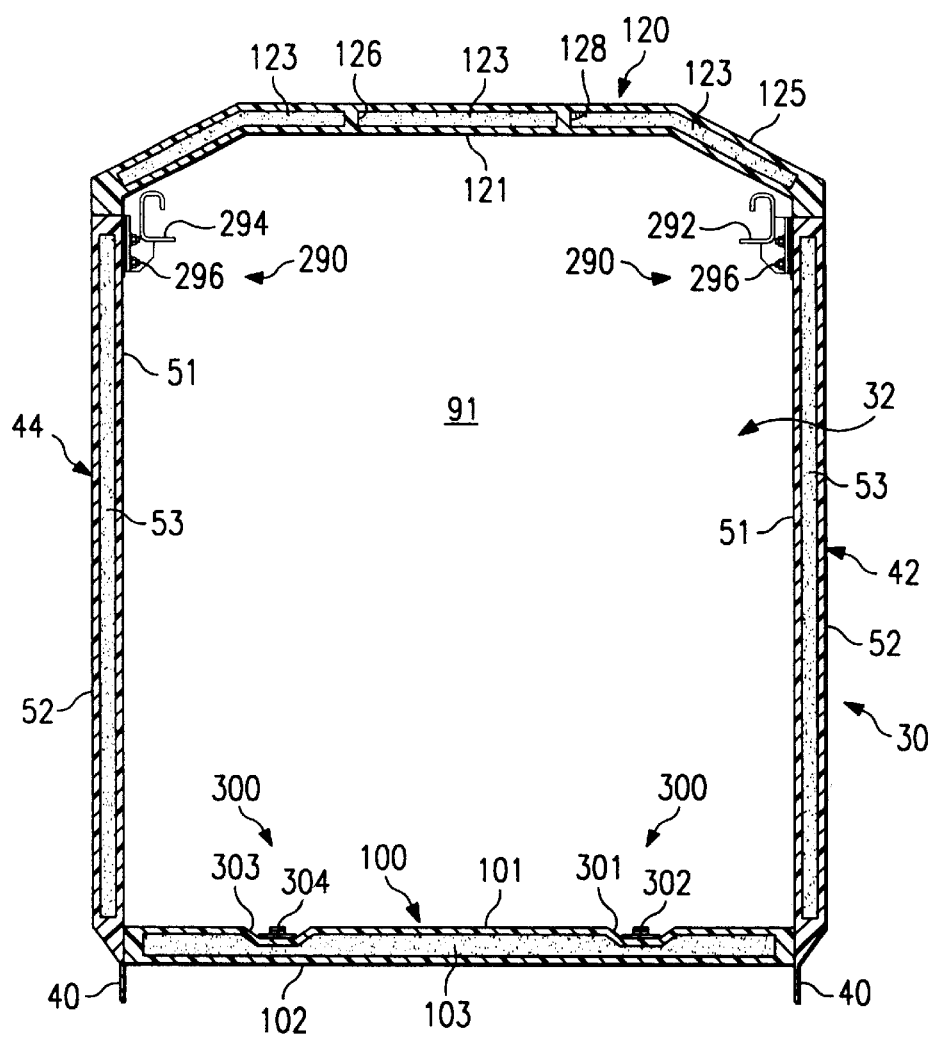
FIG. 11 is a schematic drawing in section with portions broken away showing an interior view of a composite box structure incorporating a further embodiment of the present invention.

Roof 120 may have a generally concave configuration as shown in FIG. 11. As a result, the individual components may be more easily handled, shipped and/or stored until they are attached to each other using a combination of adhesive bonds and/or mechanical fasteners. For some applications, sidewalls 42 and 44, endwalls 82 and 84, floor 100 and roof 120 may be formed using vacuum bagging techniques. Various adhesive and/or mechanical bonds may then be formed between the individual components to fabricate composite box structure 30.

Sidewalls 42 and 44, endwalls 82 and 84, floor 100 and roof 120 preferably have a foam core covered or wrapped with multiple plies of fiber material which has been infused with a selected resin to encapsulate the foam core with one or more layers of fiber reinforced plastic. The multiple plies of fiber material and the selected resin also form fiber reinforced plastic interior surfaces and exterior surfaces for composite box structure 30. Materials other than foam may be used to form the respective cores.

As discussed later in more detail, sidewall 42 is preferably formed from two sections 42a and 42b. Sidewall 44 is also preferably formed from two sections 44a and 44b. See FIG. 5. During assembly of composite box structure 30 on railway car underframe 200, first section 42a and second section 42b are preferably spaced from each other to provide opening 46 in sidewall 42. In a similar manner, first section 44a is preferably spaced from second section 44b to provide corresponding opening 46 in sidewall 44.

Doors 180 are slidably mounted on each sidewall 42 and 44 adjacent to respective openings 46 for use in controlling access to interior 32 of railway boxcar 20. The height of each opening 46 corresponds generally with the distance between floor 100 and respective longitudinal edges 122 and 124 of roof 120.

The center of each opening 46 preferably corresponds approximately with the midpoint of respective sidewalls 42 and 44. Each door 180 has a first position blocking the respective opening 46 to form a thermal barrier between hollow interior 32 and the exterior of railway boxcar 20. Each door 180 also has a second position which allows access to hollow interior 32 of railway boxcar 20 through the respective opening 46. A pair of door stops 181 and 182 are preferably mounted on the exterior of each sidewall 42 and 44 to limit longitudinal movement of the respective door 180 during movement from its first position to its second position.

In FIG. 1A, door 180 is shown slidably mounted on upper track 194 and lower track 196 intermediate its first position which blocks opening 46, and its second position in which edge 183 of door 180 contacts respective door stops 181 and 182. For some applications, door 180 may be formed from composite materials similar to composite box structure 30.

Railway car underframe 200, as shown in FIGS. 1A, 1B, 3 and 4, includes a pair of railway trucks 202 and 204 located adjacent to each end of railway boxcar 20. Safety equipment such as ladders 206 and handbrake 208 are preferably secured to railway car underframe 200 with no connections or attachments to composite box structure 30. Standard railway couplings 210 are also provided on center sill 214 at each end of railway car underframe 200. End of car cushing units 212 are preferably disposed between each end of center sill 214 and respective couplings 210. Railway couplings and end of car cushion units satisfactory for use with the present invention are available from various vendors including FM Industries, Inc. located at 8600 Will Rogers Blvd., Fort Worth, Tex. 76140, and Keystone Railway Equipment Company located at 3420 Simpson Ferry Road, Camp Hill, Pa. 17001-0456. U.S. Pat. No. 5,320,046 entitled Low Profile Railway Car shows one example of railway car couplings and cushioning units.

Temperature controlled railway car 320 incorporating teachings of the present invention is shown in FIGS. 2A and 2B. Temperature controlled railway car 320 includes composite box structure 330 and temperature control system 340. Composite box structure 330 may be formed with composite roof 120a, sidewalls 342 and 344, endwalls 82a and 84, floor 100a. As a result of the increased length of railway car 320, portions of ladder 206a are preferable secured within and integrally mold as a part of sidewalls 342b and 344b to meet applicable AAR design requirements. For cars with a shorter length such a railway car 20, ladder 206 may be directly attached to railway car underframe 200.

Refrigeration unit 346 is a major component of temperature control system 340. An air flow management system (not expressly shown) may be included as another major component of temperature control system 340. For some applications, such as transporting products in sub-zero, winter environments, temperature control system 340 may include a heater.

Refrigeration unit 346 may be a self-contained refrigeration unit including a condenser (not expressly show), air blowers (not expressly shown), and external fuel tank 348. As shown in FIGS. 2A and 2B, external fuel tank 348 may be mounted on one end of railway car underframe 200a adjacent to refrigeration unit 346. Impact shield 350 is preferably mounted on railway car underframe 200a adjacent to external fuel tank 348. For one application, impact shield 350 has a generally rectangular configuration with a height of approximately eighteen inches (18") and a thickness of approximately three eights of an inch (3/8"). Impact shield 350 is preferably formed from impact resistant steel alloys.

Refrigeration unit 346, sometimes described as a "self-contained refrigeration unit," may include a diesel engine (not expressly shown). For some applications, refrigeration unit 346 may provide air flow in the range of 3600 CFM. Refrigeration unit 346 provides the advantage of easier and faster maintenance as compared to conventional refrigerated boxcars with similar performance characteristics. As a result, temperature control system 340 will generally lower maintenance time and costs and increase the amount of time that temperature controlled railway car 320 remains in service between repair periods.

Refrigeration unit 346 may include a programmable unit able to control and maintain desired temperatures within composite box structure 330. Refrigeration unit 346 may include a keypad for inputting data for desired system performance and a microprocessor to control and monitor the functions and performance of refrigeration unit 346 and temperature control system 340. Refrigeration unit 346 may also include a satellite monitoring system (not expressly shown) or cellular technology to transmit from remote locations such information as the performance or location of refrigeration unit 346 and/or the temperature within the interior of composite box structure 330. For some applications, refrigeration unit 346 may be a Model SB-IIISR® (SMART) self-contained refrigeration system available from Thermo King, which is commonly used in motor carrier trailers and other large containers. Refrigeration units from other companies including CARRIER and DRING may be satisfactorily used with the present invention.

As shown in FIGS. 2A and 2B, refrigeration unit 346 may be mounted on endwall 82a of composite box structure 330. Differences between endwall 82 and endwall 82a will be discussed later in more detail. End platform 220 is preferably mounted and attached to railway car underframe 200 adjacent to refrigeration unit 346 to provide easy access thereto. External fuel tank 348 is preferably located under end platform 220. For some applications, fuel tank 346 may be attached to railway car underframe 200a below the area of doors 180 or near railway truck 202. Locating external fuel tank 348 within portions of railway car underframe 200a may provide additional protection in the event of a collision between temperature controlled railway car 320 and other railway cars or obstacles.

As shown in FIGS. 3 and 4, railway car underframe 200 includes center sill 214 with a pair of end sills 282 and 284 and a pair of side sills 242 and 244 arranged in a generally rectangular configuration. The dimensions of the side sills 242 and 244 and end sills 282 and 284 correspond approximately with the dimensions associated with floor 100 of composite box structure 30. Railway car underframe 200 also includes a plurality of cross bearers 216 extending laterally between center sill 214 and the respective side sills 242 and 244. For the embodiment shown in FIG. 3, railway car underframe 200 includes seven cross bearers 216 spaced longitudinally from each other between railway trucks 202 and 204.

Railway car underframe 200 preferably includes a plurality of longitudinal stringers 230 extending parallel with center sill 214 and spaced laterally from each other between center sill 214 and the side sills 242 and 244. For the embodiment shown in FIG. 3, railway car underframe 200 includes four longitudinal stringers 230 between side sill 242 and center sill 214 and four longitudinal stringers 230 between center sill 214 and side sill 244. However, the number of longitudinal stringers 230 may be varied depending upon the desired load carrying characteristics for the resulting railway boxcar 20.

Center sill 214, side sills 242 and 244 and end sills 282 and 284 may each have respective first surfaces 215, 243, and 245 which are disposed coplanar with each other. Each longitudinal stringer 230 includes first surface 231 disposed coplanar with these first surfaces 215 and a second surface 232 resting on cross bearers 216. For some applications, portions of composite box structure 30 may be adhesively bonded or coupled with these first surfaces 215, 231, 243 and 245. As will be explained later in more detail, loads placed on floor 100 within composite box structure 30 are transmitted through longitudinal stringers 230 onto cross bearers 216 and then to center sill 214.

Railway car underframe 200 also includes a pair of body bolsters 222 and 224 with each body bolster 222 and 224 disposed over respective railway trucks 202 and 204. Body bolsters 222 and 224 extend laterally between center sill 214 and the respective side sills 242 and 244. As best shown in FIG. 3, each body bolster 222 and 224 includes a pair of cover plates 252 and 254 which extend over respective railway trucks 202 and 204.

Cover plates 252 and 254 are preferably formed from relatively thick metal plates with dimensions selected to provide clearance for the wheels of the associated railway trucks 202 and 204. Cover plates 252 and 254 may be sized to accept loads from floor 100 and to transfer these loads to center sill 214 and/or side sills 242 and 244. Cover plates 252 and 254 also protect adjacent portions of composite box structure 30 from any debris thrown from the respective railway trucks 202 and 204. Cover plates 252 and 254 may structurally support relatively short portions of longitudinal stringers 230 extending between cover plates 252 and 254 and the respective end sills 282 and 284. In FIG. 3, these portions of longitudinal stringer 230 have been designated 230a.

Each cover plate 252 includes first surface 253 disposed coplanar with first surface 215 of center sill 214 and first surface 243 of side sill 242. Each cover plate 254 includes first surface 255 which is also disposed coplanar with first surface 215 of center sill 214 and first surface 245 of side sill 244. First surfaces 253 and 255 are also located on cover plates 252 and 254 opposite from railway trucks 202 and 204. For some applications, portions of composite box structure 30 may be adhesively coupled with first surfaces 215, 231, 243, 245, 253 and/or 255 of railway car underframe 200.

For some applications, the width and depth of center sill 214 may be substantially the same as center sills associated with conventional railway boxcars. For such application composite box structure 30 will carry train loads associated with a conventional boxcar. Each cross bearer 216 will preferably have sufficient depth such that cross bearers 216 can satisfactorily transfer loads placed on side sills 242 and 244 and longitudinal stringers 230 onto center sill 214. As a result of the teachings of the present invention, the cost of manufacturing and the weight of railway car underframe 200 may be reduced by allowing more of the train loads and forces associated with lading placed within railway boxcar 20 to be carried by composite box structure 30.

One of the technical advantages of the present invention includes providing adhesive bonding and/or mechanical coupling between composite box structure 30 and railway car underframe 200 as desired. Examples of such adhesive bonding and/or mechanical coupling may be found in pending patent application U.S. Ser. No. 08/684,345 entitled Insulated Composite Railway Boxcar and Method, now U.S. Pat. No. 5,765,485, and pending patent application U.S. Ser. No. 08/986,187 entitled Railway Car Underframe for an Insulated Composite Boxcar, now U.S. Pat. No. 6,000,342.

For the embodiments shown in shown in FIGS. 1A and 2A, a plurality of mechanical couplings 38 are preferably formed between fiber reinforced composite flanges 40 and side sills 242 and 244 for railway boxcar 20 and side sills 242a and 244a for temperature controlled railway car 320. Mechanical couplings 38 and fiber reinforced composite flanges 40 as shown in FIGS. 10 and 11 will be discussed later in more detail. For the embodiments of the present invention as shown in FIGS. 1A and 2A, mechanical couplings 38 are preferably disposed along the full length of respective side sills 242 and 242a. Corresponding mechanical couplings 38 (not expressly shown) may also be disposed longitudinally along respective side sills 244 and 244a. A typical spacing between mechanical coupling 38 may be from six inches (6") to twelve inches (12").

Mechanical couplings 38 may extend around the perimeter of composite box structures 30 and 330 and respective railway car underframes 200 and 200a. Mechanical couplings 38 (not expressly shown) may be formed between fiber reinforced flanges (not expressly shown) extending from endwalls 82 and 84 and respective end sills 282 and 284. Alternatively, mechanical couplings 38 may only be provided along respective side sills 242 and 244 or 242a and 244a for a limited distance extending from the mid point of each side sill 242, 244, 242a and 244a. By using only a limited number of mechanical couplings 38 adjacent to respective middle portions of composite box structures 30 and 330 and respective railway cars underframes 200 and 200a, the end portions of composite box structure 30 and 300 may expand or contract relative to the respective railway car underframe 200 and 200a in response to temperature changes. The number of mechanical couplings 38 may be varied depending upon the length of respective railway car underframe 200 and 200a and required force to securely attach composite box structures 30 and 330 thereto. The use of mechanical couplings 38 may be particularly beneficial to allow substantially reducing or eliminating adhesive bonding between composite box structures 30 and 330 respective railway car underframes 200 and 200a.

If a portion of composite box structure 30 or 330 should be damaged, mechanical couplings 38 adjacent to the damaged portion or portions may be disengaged from respective railway car underframe 200 or 200a. The damaged portions or portions of composite box structure 30 or 330 may then be cut out and removed. A replacement piece of composite material having the desired configuration and corresponding mechanical coupling may then be inserted into composite box structure 30 or 330 to take the place of the damaged portion or portions. Various types of sealing compounds and/or adhesive bonding agents may be used to secure the replacement piece with the original component or components used to form composite box structure 30 or 330. Mechanical couplings 38 may be reattached as required.

As a result of the present invention, a wide variety of materials may be used to form the various components associated with railway car underframes 200 and 200a. For example, center sill 214, cross bearers 216, body bolsters 222 and 224, cover plates 252 and 254, longitudinal stringers 230 and mechanical tie down connection assemblies 260 and other components associated with railway car underframe 200 may be satisfactorily formed from various steel alloys, aluminum alloys, fiber reinforced plastics, cermets and composites of these materials. Composite box structures 30 and 330 allow selecting a wide variety of materials and composites for use in fabricating railway car underframes 200 and 200a to optimize performance characteristics, reduce manufacturing costs and repair/maintenance costs associated with the resulting railway boxcars 20 and temperature controlled railway cars 320.

Figure 5:
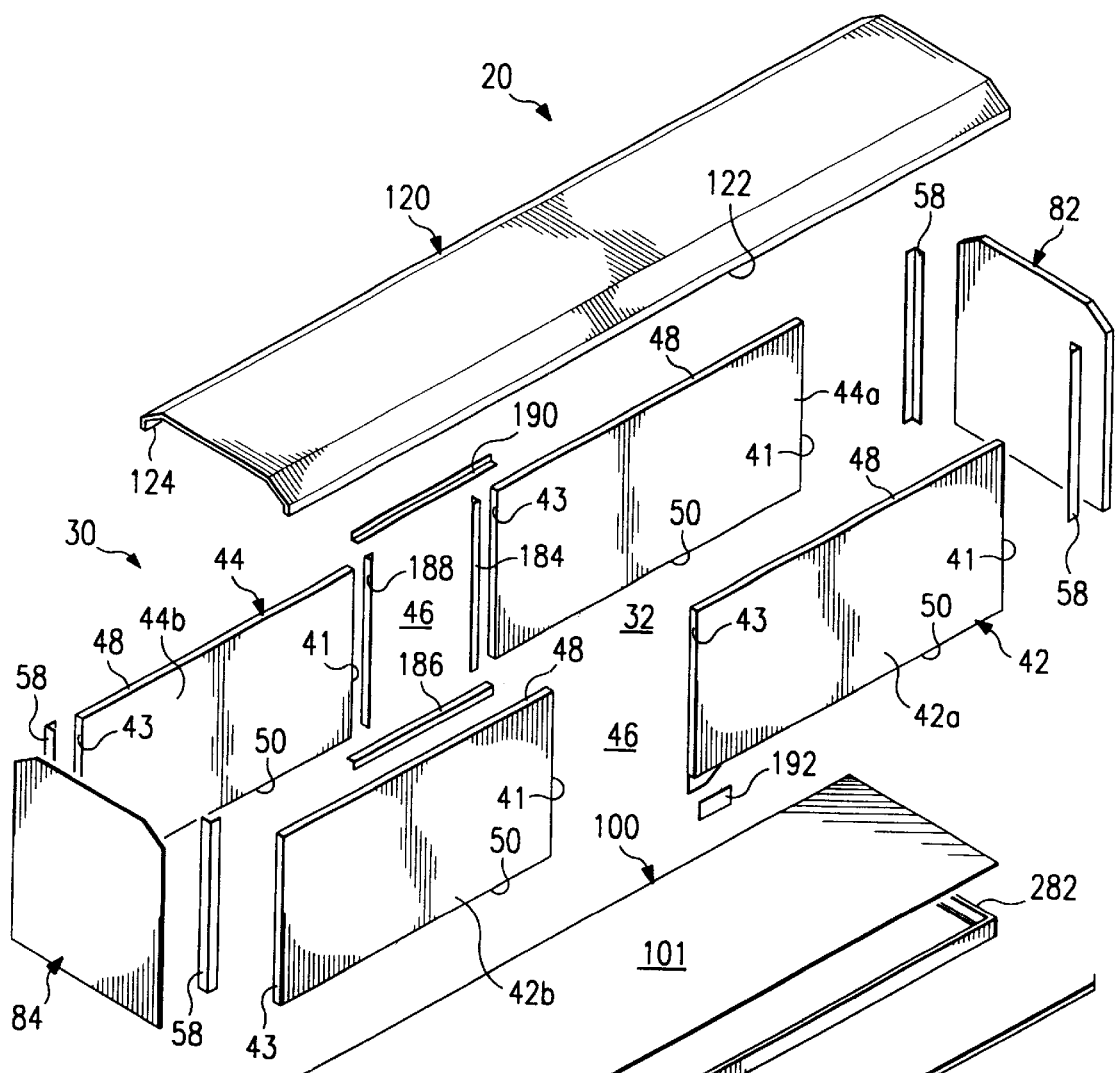
FIG. 5 is a schematic drawing showing an exploded, isometric view of individually molded components which may be used to form a composite box structure for a railway boxcar in accordance with teachings of present invention.
Figure 6:
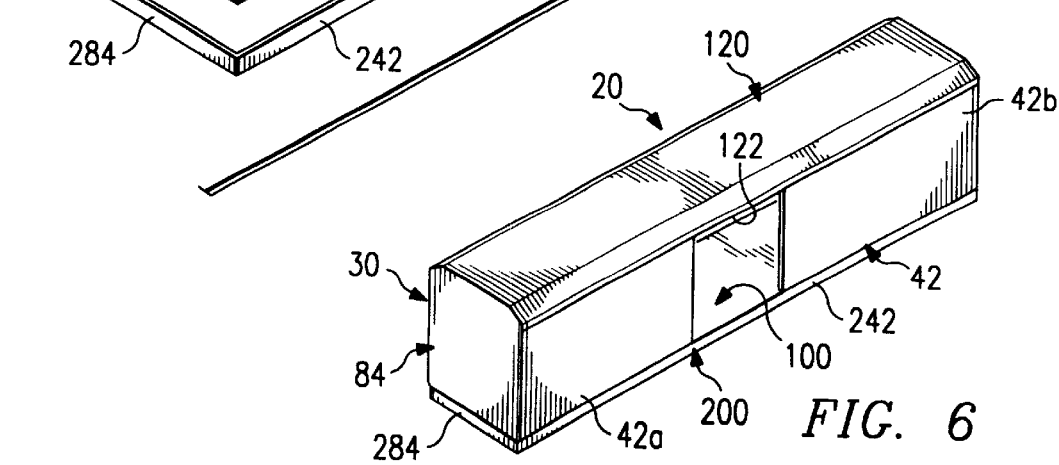
FIG. 6.is a schematic drawing showing an isometric view of the composite box structure formed from the individually molded components of FIG. 5 mounted on portions of a railway car underframe.

FIG. 5 is a schematic drawing showing an exploded view of various individually molded components which may be attached to each other to form composite box structure 30. FIG. 6 shows the resulting composite box structure 30 mounted on a portion of railway car underframe 200. Floor 100 preferably has a generally rectangular configuration with a length and width corresponding approximately with the length and width of railway car underframe 200. For some applications, floor 100 may be mechanically and/or adhesively bonded with railway car underframe 200. For other applications floor 100 may only be resting on railway car underframe 200 during the assembly of the other components associated with composite box structure 30. For the embodiment shown in FIG. 5, floor 100 preferably has a generally smooth uniform interior surface formed by first layer 101 of fiber reinforced plastic.

As shown in FIG. 5, sidewalls 42 and 44 are preferably formed from individually molded components designated respectively as sections 42a and 42b and section 44a and 44b. Each section 42a, 42a, 44a and 44b has a generally flat, rectangular configuration defined in part by upper edge or top edge 48 and respective bottom edge or lower edge 50. Each section 42a, 42b, 44a and 44b also includes respective first end 41 and second end 43. First ends 41 and second ends 43 extends vertically between associated top edges 48 and bottom edges 50 when the assembly of composite box structure 30 has been completed.

For the embodiment shown in FIG. 5, respective first ends 41 of sections 42a and 44a correspond with the respective ends of sidewalls 42 and 44 disposed adjacent to endwall 82. Respective second ends 43 of sections 42b and 44b correspond with the respective ends of sidewalls 42 and 44 disposed adjacent to endwall 84. Reinforcing member or corner support 58 formed from fiber reinforced composite materials may be installed at the corner connections or joints between sidewalls 42 and 44 and respective endwalls 82 and 84. For some applications, corner supports 58 are preferably formed from carbon fibers.

First sections 42a and 42b are preferably spaced longitudinally from each other to define in part opening 46 in sidewall 42. In a similar manner, first section 44b and second section 42b are preferably spaced longitudinally from each other to define in part opening 46 in sidewall 44. For some applications, a plurality of reinforcing flanges or door frame members 184, 186, 188 and 190 may be disposed around the perimeter of each opening 46. Only one set of door frame members 184, 186, 188 and 190 is shown in FIG. 5. Door frame members 184, 186, 188 and 190 are preferably formed from fiber reinforced composite materials. For one application, door frame members 184, 186, 188 and 190 are preferably formed from carbon fibers.

Door frame members 184 may be attached to second end 43 of first section 42a and 44b. Door frame members 188 may be attached to first end 41 of sections 42b and 44b. Door frame members 186 may be attached to an adjacent portion of floor 100 and door frame members 190 may be attached to a portion of respective longitudinal edges 122 and 124 of roof 120. For some applications, one or more metal gussets 192 may be attached to sidewalls 42 and 44 adjacent to openings 46 and respective side sills 242 and 244. Metal gussets 192 may be helpful to prevent respective doors 180 from damaging adjacent portions of composite box structure 30.

Figures 7, 8:
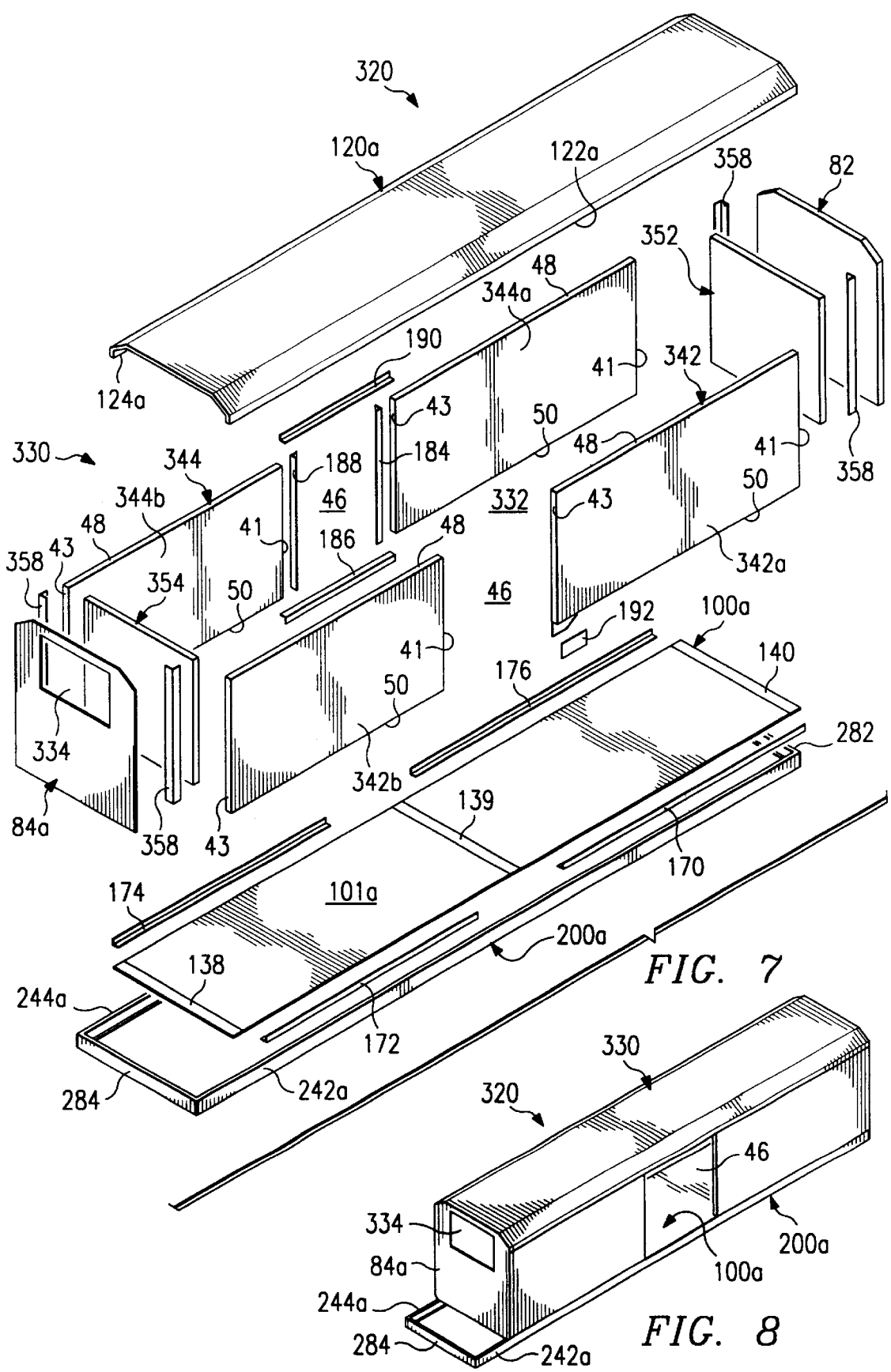
FIG. 7 is a schematic drawing showing an exploded, isometric view of individually molded components which may be satisfactorily used to form a composite box structure for a temperature controlled railway car in accordance with teachings or the present invention.
FIG. 8 is a schematic drawing showing the composite box structure formed from the individually molded components of FIG. 7 mounted on portions of a railway car underframe.

FIG. 7 is a schematic drawing showing an exploded view of various individually molded components which may be attached to each other to form composite box structure 330. FIG. 8 shows the resulting composite box structure 330 mounted on a portion of railway car underframe 200a. Various components associated with composite box structures 30 and 330 have substantially the same overall configuration. However, the length of several of the components used to form composite box structure 330 will be greater than the length of the corresponding component used to form composite box structure 30. For example, floor 100a will preferably be longer than floor 100. However, the length of floor 100a is less than the length of railway car underframe 200a. As a result, portions of side sills 242a, 244a and end sill 284 extend longitudinally from endwall 84a to accommodate installation of end platform 220, external fuel tank 348 and impact shield 350. Also, floor 100a preferably has three drain channels 138, 139 and 140 formed in first layer 101a of fiber reinforced plastic material. Drain channels 138, 139 and 140 are provided to assist in removing water or other liquids which may form within hollow interior 332. Also, drain channels 138, 139 and 140 assist with cleaning interior 332 of composite box structure 330 prior to loading.

Composite box structure 330 will typically be assembled by first placing floor 100a on railway car underframe 200a. As shown in FIG. 7, sidewalls 342 and 344 are preferably formed from individually molded components designated respectively as sections 342a and 342b and sections 344a and 344b. Each section 342a, 342b, 344a and 344b has a generally flat, rectangular configuration defined in part by upper edge or top edge 48 and respective bottom edge or lower edge 50. Each section 342a, 342b, 344a and 344b also includes respective first end 41 and second end 43. Sidewalls 342 and 344 may be assembled with endwalls 82 and 84a and floor 100a in much the same manner as previously described with respect to composite box structure 30.

Interior bulkheads 352 and 354, along with corner/bulkhead supports 358, represent one of the differences between composite box structures 30 and 330. Interior bulkheads 352 and 354 are preferably formed as individually molded components in substantially the same manner as endwalls 82 and 84a. However, the height of interior bulkheads 352 and 354 is preferably less than the height of the associated endwalls 82 and 84a.

Corner/bulkhead supports 358 also maintain a desired longitudinal spacing between interior bulkheads 352 and 354 and respective endwalls 82 and 84a. As a result, interior bulkheads 352 and 354 define a portion of an airflow circulation path within hollow interior 332 of composite box structure 330.

Respective sidewalls/floor supports 170, 172, 174 and 176 may be disposed at the junction or joint between respective sections 342a, 342b, 344a, 344b and floor 100. Sidewalls/floor supports 170, 172, 174 and 176 are preferably formed from fiber reinforced composite materials. For one application, sidewalls/floor supports 170, 172, 174 and 176 are preferably formed from carbon fibers. Door frame members 184, 186, 188 and 190 may be secured around the perimeter of respective openings 46 of sidewalls 342 and 344 in the same manner as previously described with respect to composite box structure 30.

FIG. 9 shows cross section 130 which is generally representative of a typical individually molded component used to form composite box structures 30 and 330. Cross section 130 may represent a portion of sidewalls 42 and 44, sidewalls 342 and 344, endwalls 82, 84 and 84a, floors 100 and 100a, roofs 120 and 120a and/or interior bulkheads 352 and 354. Cross section 130 preferably includes a plurality of core members 132 encapsulated in multiple layers of fiber reinforced plastic 134. The individually molded component represented by cross section 130 may be formed by wrapping a plurality of foam blocks with selected fiber material. The foam blocks will correspond with core members 132. The foam blocks may then be placed in a closed mold between a first layer of fiber material and a second layer of fiber material. For some applications, multiple plies of fiber material may be used.

The fiber material wrapped on the foam blocks along with the first and second plies of fiber material are then impregnated with a selected resin or resins to form a continuous web of fiber reinforced plastic layers 134 encapsulating core members 132. For some applications, the foam blocks may be coated or treated to prevent the foam blocks from absorbing or being infused with the selected resin or resins. Material other than foam blocks may be used to form core members 132.

Various features of the present invention will be described with respect to composite box structure 30 as shown in FIGS. 10 through 18. These same comments generally apply to composite box structure 330. As shown in FIGS. 10, 11 and 15 through 18, first layer 51 of fiber reinforced plastic is preferably disposed on the interior surface of each sidewall 42 and 44. Second layer 52 of fiber reinforced plastic is preferably disposed on the exterior surface of each sidewall 42 and 44. Each sidewall 42 and 44 preferably includes foam core 53 encapsulated between layers 51 and 52 of fiber reinforced plastic.

In a similar manner, as shown in FIGS. 1A, 1B, 10 and 18, first layer 91 of fiber reinforced plastic is preferably disposed on the interior surface of each endwall 82 and 84. Second layer 92 of fiber reinforced plastic is preferably disposed on the exterior surface of each endwall 82 and 84. Each endwall 82 and 84 includes foam core 93 encapsulated between layers 91 and 92 of fiber reinforced plastic. Floor 100 preferably includes foam cores 103 encapsulated between layers 101 and 102 of fiber reinforced plastic. Roof 120 also includes foam cores 123 encapsulated between layers 121 and 125 of fiber reinforced plastic. The configuration of foam cores 53, 93, 103 and 123 may be varied in accordance with the teachings of the present invention depending upon the requirements of the resulting railway car.

First layers 51, 91 and 101 cooperate with each other to provide a generally smooth interior surface of fiber reinforced plastic for composite box structure 30. In a similar manner, second layers 52, 92 and 102 cooperate with each other to provide a generally smooth exterior surface of fiber reinforced plastic for composite box structure 30.

Foam cores 53, 93, 103 and 123 may be formed from various types of material such as urethane, polyurethane, styrene and polystyrene. For some applications, cores 53, 93, 103 or 123 may be formed with light metal foam. Also, foam cores 53, 93, 103 and 123 may have various configurations such as foam blocks wrapped with one or more plies of a selected fiber material or layers of a selected foam material alternating with plies of a selected fiber material.

Depending upon the intended application for the resulting railway boxcar 20 or temperature controlled railway car 320, the fiber material may include carbon, boron, graphite, glass, aramid or a combination of these materials. Aramids such as KEVLAR® fibers and NOMEX® fibers available from E.I. DuPont De Nemours & Co. may be particularly useful in fabricating composite box structures for railway cars. Other fiber materials may be satisfactorily used with the present invention. Again, depending upon the intended application for railway boxcar 20 or temperature controlled railway car 320, the resin may be selected from a wide variety of polymers including epoxy, polyester, vinylester and vinyl. Also, other resins may be satisfactorily used with the present invention. Properly selecting the type of material used to form foam cores 53, 93, 103 and 123 along with other teachings of the present invention will substantially reduce or minimize potential heat transfer paths. Composite box structures 30 and 330 may have heat transfer rates of approximately one hundred sixteen (116) BTUs per hour per degree Fahrenheit or less.

Foam cores 53, 93, 103 and/or 123 may be formed from a grid of the selected foam material alternating with plies of the selected fiber material. The configuration of the layers of foam material and fiber material may be varied to provide the desired structural strength for the respective sidewalls 42 and 44, endwalls 82 and 84, floor 100 and roof 120. U.S. Pat. No. 5,052,906 shows examples of using multiple layers of fiber material and a grid type resin distribution system which may be satisfactorily used to form sidewalls 42 and 44, endwalls 82 and 84, floor 100 and/or roof 120.

Corresponding interior surfaces 91 have at least one layer of fiber reinforced plastic and corresponding exterior surfaces 92 also has at least one layer of fiber reinforced plastic. For one application, two plies of fiber material were used to form interior surface 91 and exterior surface 92. The fiber materials within the grid are infused with resin to form a web of fiber reinforced plastic layers encapsulating the foam material. For one application, endwalls 82 and 84 have been formed with this grid configuration having continuous horizontal plies of fiber material and discontinuous vertical plies of fiber material.

For the embodiment of the present invention as shown in FIG. 10, floor 100 includes thirteen vertical layers 118 of fiber reinforced plastic disposed within foam core 103 between interior surface 101 and exterior 102. Vertical layers 118 of fiber reinforced plastic extend longitudinally along the length of floor 100 and are spaced laterally from each other across the width of floor 100. For the embodiment shown in FIG. 10, one of the vertical layers 118 of fiber reinforced plastic are disposed on center sill 214. The remaining vertical layers 118 of fiber reinforced plastic are disposed respectfully on first surfaces 231 of longitudinal stringer 230. The number of longitudinal stringers 230 and vertical layers 118 may be varied depending upon the intended use of the resulting railway car 20.

The portion of railway car underframe shown in FIG. 10 includes body bolster to 224 which is disposed over railway truck to 204. Body bolster 224 extends laterally between center sill 214 and side sill 242 and 244. As previously shown in FIG. 3, body bolster 244 includes four cover plates 252, 254, 256 and 258. Cover plates 252 and 254 are shown in FIG. 10. Cover plates 252, 254, 256 and 258 and preferably disposed upon and are attached to respective longitudinal stringers 268 which extend between body bolster 224 and the associated cross bearer 216. As shown in FIG. 10, longitudinal stringers 368 may have a generally L shaped cross section to provide clearance for the wheels associated with railway trucks 202 and 204. Stringer having a "channel shaped" cross section may also be satisfactorily used. Additional stringers 370, 372, 373, 374 and 376 may also be installed between body bolster 224 and respective cross bearers 216. Stringers 370, 372, 374 and 376 may have a generally L shaped cross section or alternatively a channel shaped cross section.

As shown in FIG. 11, interior surface 121 of 120 has a generally concave configuration and exterior surface 123 has a generally corresponding convex configuration. Foam core 123 of roof 120 may be divided longitudinally by fiber reinforced plastic layers 126 and 128. Fiber reinforced plastic layers 126 and 128 are preferably disposed on opposite sides of the longitudinal center line of roof 120 and extend from one end of roof 120 to the opposite end of roof 120. Fiber reinforced plastic layers 126 and 128 provide structural strength for roof 120 while at the same time allowing for limited flexing and/or twisting of roof 120 during movement of the associated railway car 20. Fiber reinforced plastic layers 126 and 128 function as longitudinal stiffeners for roof 120.

As shown in FIG. 11 upper load divider track assembly 290 includes a pair of railway tracks 292 and 294 with portions of each track mounted on and disposed between respective side walls 42 and 44 and roof 120. A plurality of bracket assemblies 296 are used to secure tracks 292 and 294 with interior surface 51 of respective side walls 42 and 44 adjacent to interior surface 121 of roof 120.

Portions of lower load divider track assembly 300 are also shown in FIG. 11 having a pair of tracks 302 and 304 disposed within first longitudinal recess 301 and second longitudinal recess 303. First longitudinal recess 301 is formed in interior surface 101 of floor 100 adjacent to side wall 42. Second longitudinal recess 303 is formed in interior surface 101 of floor 100 located adjacent to side wall 44. Tracks 292 and 294 extend generally parallel with each other and with tracks 302 and 303.

Figure 12:
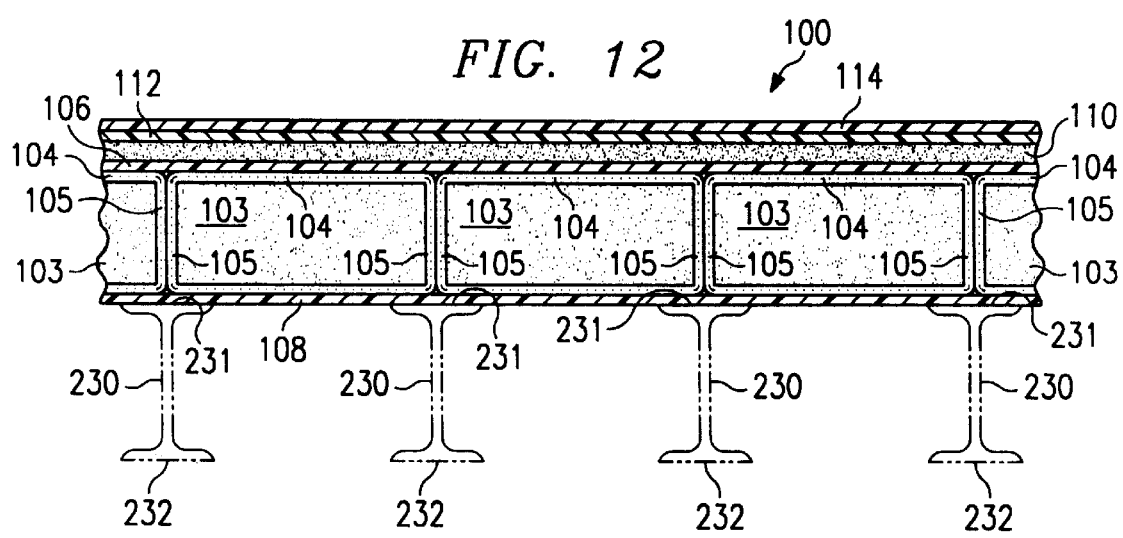
FIG. 12 is a schematic drawing in section with portions broken away showing a composite floor having a foam core and multiple plies of fiber material prior to molding in accordance with teachings of the present invention.

For some applications railway car underframe 200 preferably includes a plurality of longitudinal stringers 230. See FIGS. 12, 13 and 14. Each longitudinal stringer 230 has first surface 231 and second surface 232. For purposes of illustrating various aspects of the present invention, portions of floor 100 are shown in FIG. 12 as they would appear without having first been infused with a selected resin. Normally, the various components used to form composite box structure 30 are only mounted on railway car underframe 200 after completion of the molding process for each component which includes infusion with the selected resin.

As illustrated in FIG. 12, floor 100 preferably includes a plurality of foam blocks 103 which have each been wrapped with one or more plies of fiber material 104. During the molding process, foam blocks 103 are disposed adjacent to each other and extend over the length and width of floor 100. This configuration results in vertical plies 105 of fiber material disposed between adjacent foam blocks 103 extending longitudinally along the length of floor 100. First ply 106 of fiber material is disposed on the interior portions of foam blocks 103. A second ply 108 of fiber material is disposed on the exterior of foam blocks 103.

For some applications, floor 100 could then be formed by infusing or molding first ply 106, fiber layers 104 and second ply 108 with the selected resin. For many applications, foam blocks 103 will not carry compression and shear forces associated with placing a heavy load such as a forklift moving cargo on interior surface 101 of floor 100. Thus, layer 110 of a felt type material such as polyester is preferably placed on first fiber ply 106 along with two additional plies 112 and 114 of fiber material. The configuration of felt type material 110 and multiple plies of fiber material 104, 106, 112 and 114 results in providing a thick layer 116 of fiber-reinforced plastic extending over the length and width of interior surface 101 of floor 100.

The width of foam blocks 103 is preferably selected to be approximately equal to the distance between the centerline of adjacent longitudinal stringers 230. Thus, vertical layers 105 of fiber material are located within floor 100 at a position corresponding approximately with the position of respective longitudinal stringer 230 in railway car underframe 200. Infusion of fiber material plies 104, 106 108, 112 and 114 along with felt layer 110 results in forming a continuous web of fiber reinforced plastic which encapsulates foam blocks 103. Thus, any loads placed on interior surface 101 of floor 100 are transmitted through thick layer 116 of fiber reinforced plastic to vertical layers 118 of fiber reinforced plastic and onto the respective longitudinal stringer 230 to provide the desired load carrying capacity for floor 100.

Plies of fiber material 104, 106, 108, 112 and 114 may be formed from the same types of material. Alternatively, plies 104, 106, 108, 112 and 114 may be formed from different types of fiber material to provide the desired strength for floor 100. When the fiber plies are infused with the selected resin, the resulting structure is a thick, continuous web of fiber reinforced plastic 116 and 118 as shown in FIG. 13. As shown in FIG. 14, floor 100 may also be formed with vertical layers of fiber reinforced plastic 118 extending generally transverse to longitudinal stringers 230.

For some applications, the resulting composite box structures 30 and 330 may be painted or covered with coating materials that reflect solar energy from the sun. For example, a coating material containing ceramic fibers (not expressly shown) can be applied to the exterior surfaces of composite box structure 30 and 330 to significantly reduce the amount of heat absorbed from ultraviolet rays and infrared rays. By using such coating materials, the thickness of foam cores 53, 93, 103 and/or 123 may be reduced while maintaining the same level of insulation or the effectiveness of the insulation may be increased for the same thickness of foam cores. For some applications, the coating material may be applied as part of the resin infusion process. For other applications the coating material may be applied after fabrication of composite box structure 30 has been completed. Coating systems with various ceramic fibers are available from Energy Research Center in Houston, Tex. Also, 3M Company has available various types of thin film or sheet material that may be applied to the exterior of composite box structure 30 to reflect solar energy.

Figure 15:
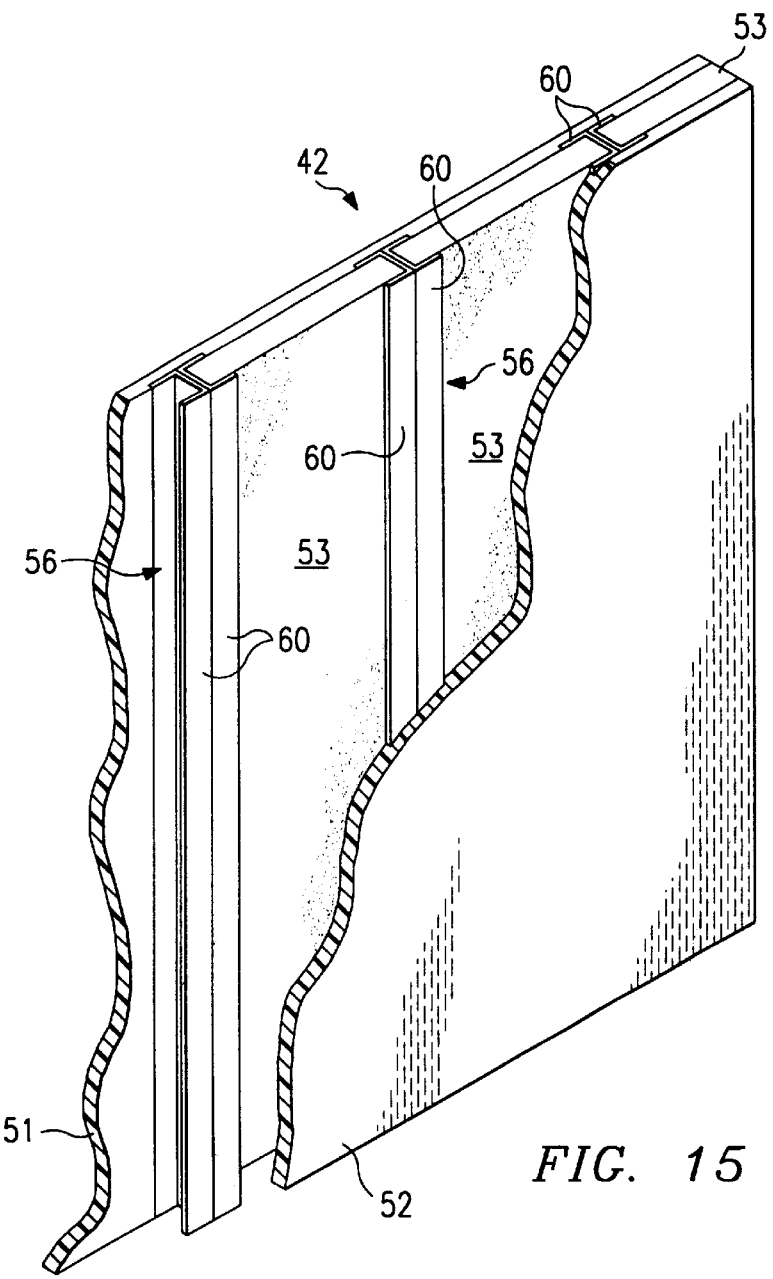
FIG. 15 is a schematic drawing with portions broken away showing an isometric view of an individually molded composite sidewall incorporating an embodiment of the present invention.
Figure 16:
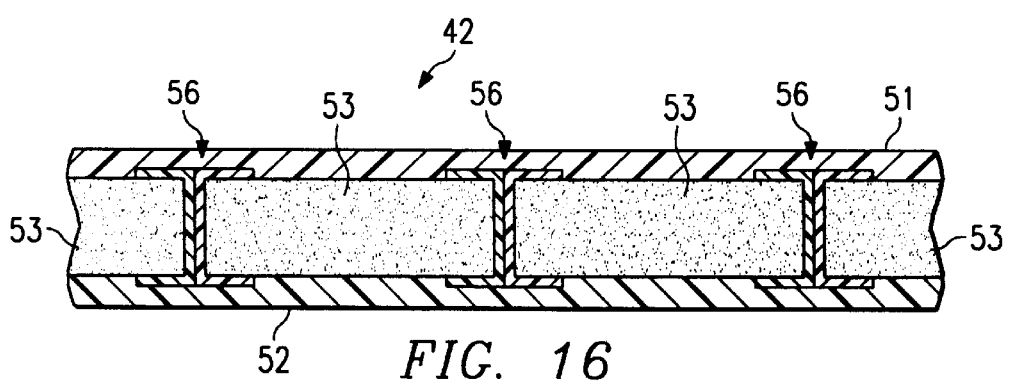
FIG. 16 is a schematic drawing in section with portions broken away of the composite sidewall of FIG. 15.

For some applications, the strength of sidewalls 42 and 44 may be substantially increased by forming a plurality of vertical supporting beams 56 during the molding process. Supporting beams 56 may sometimes be described as "carbon fiber I beams." As shown in FIGS. 15 and 16 a number of relatively large foam blocks 53 may be disposed adjacent to each other. Respective layers of fiber material 60 are preferably wrapped around the edges of each block 53 that will be disposed adjacent to each other. Layers of fiber material may also be disposed on the exterior and interior surface of foam block 53. For purposes of illustration layers of fiber material 60 are shown in FIG. 15 as they would appear prior to a fusion with a selected resin. In actual practice layers of fiber material 60 and the layers of fiber material on the exterior of foam blocks 53 would be infused with resin at the same time. The alternating configuration of fiber layers 60 and fiber reinforced layers 51 and 52 cooperate with each other to provide substantial strength for side walls 42 and 44. Infusing the layers of fiber material on exterior of foam blocks 53 and the interior of foam blocks 53 will form a continuous web of fiber reinforced plastic including vertical support beam 56 extending between interior surface 51 and exterior surface 52 as shown in FIG. 16.

Figure 17:
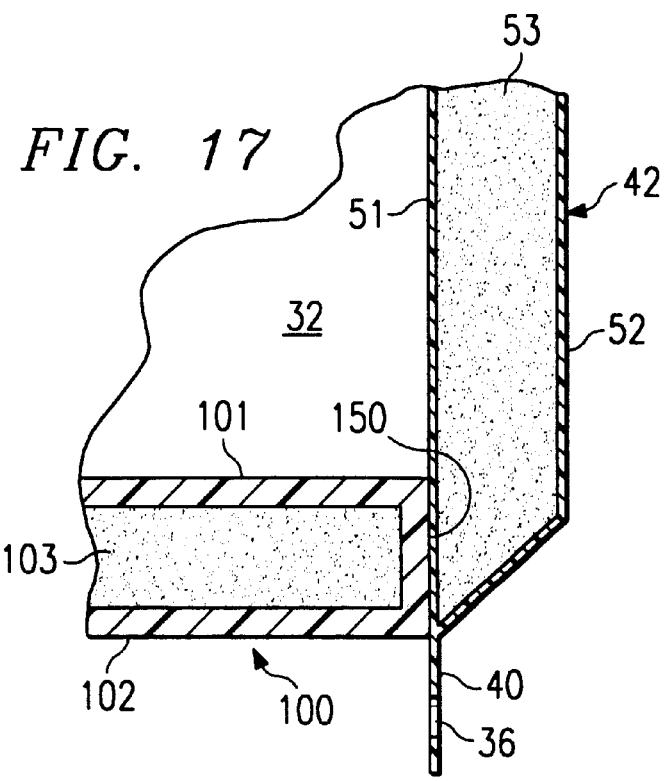
FIG. 17 is a schematic drawing in section and in elevation with portions broken away showing a connection or joint formed in accordance with one aspect of the present invention between an individually molded composite floor and an individually molded composite sidewall.
Figure 18:
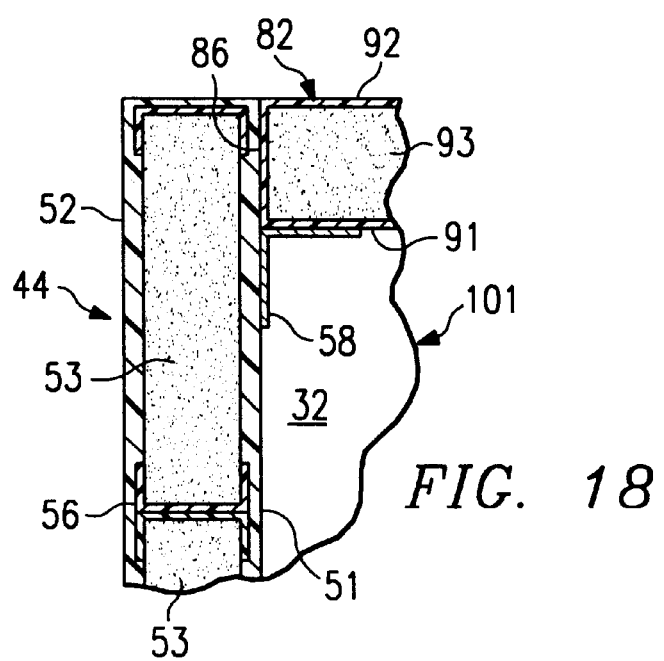
FIG. 18 is a schematic drawing in section and in elevation with portions broken away showing a corner connection or joint formed in accordance with another aspect of the present invention between an individually molded composite sidewall and an individually molded composite endwall.

FIG. 17 is a schematic drawing showing a typical connection or joint formed between individually molded floor 100 and individually molded sidewall 42. Various types of adhesive bonds may be satisfactorily used to attach interior surface 51 of sidewall 42 with the adjacent longitudinal edge 150 of floor 100. Hole 36 in composite of flange 40 is also shown in FIG. 17. For some applications as previously discussed with respect to composite box structure 330, reinforced plastic sidewall slant floor supports 170, 172, 174, or 176 may also be installed at the junction between surface 101 of floor 100 and interior surface 51 of sidewall 42.

FIG. 19 is a schematic drawing showing a typical corner connection or joint formed between individually molded sidewall 44 and end wall 82. Various types of adhesive materials may by satisfactorily used to bond edge 86 of end wall 82 with adjacent portions of interior surface 51 of sidewall 44. Similar adhesive bonding techniques may also be satisfactorily used to attach corner support fiber reinforced plastic corner support 58 with adjacent portions of interior surface 51 of sidewall 44 and interior surface 91 of end wall 82.

The following specifications are representative for railway boxcar 20 incorporating one embodiment of the present invention.

| | |
|---|---|
| Outside length | 68 feet 0 inches |
| Inside length | 67 feet 2 inches |
| Distance between centerline of railway trucks | 50 feet 0 inches |
| Outside width of composite box structure | 10 feet 0 inches |
| Inside width | 9 feet 2 inches |
| Height from rail to top of car | 15 feet 6 inches |
| Inside height from floor to roof | 11 feet ½ inch |
| Height of door opening | 9 feet 6½ inches |
| Width of door opening | 12 feet 0 inches |
| Internal volume with load dividers | 6,170 cubic feet |
| Internal volume without load dividers | 6,291 cubic feet |
| Light weight | 86,000 pounds |
| Nominal load carrying capacity | 200,000 pounds |
| Total gross rail load | 286,000 pounds |

The following specifications are representative for temperature controlled railway car 320 incorporating another embodiment of the present invention.

| | |
|---|---|
| Outside length | 70 feet 2 inches |
| Inside length | 68 feet 0 inches |
| Distance between centerline of railway trucks | 50 feet 10 inches |
| Outside width of composite box structure | 9 feet 10 inches |
| Inside width | 9 feet 1 inches |

-continued

| | |
|---|---|
| Height from rail to top of car | 17 feet 0 inches |
| Inside height from floor to roof | 12 feet 2⅞ inch |
| Height of door opening | 11 feet 3 inches |
| Width of door opening | 12 feet 0 inches |
| Internal volume | 7470 cubic feet |
| Light weight | 95,000 pounds |
| Nominal load carrying capacity | 191,000 pounds |
| Total gross rail load | 286,000 pounds |

Although the present invention and its advantages have been described in detail, it should be understood that various changes, substitutions and alterations can be made herein without departing from the spirit and scope of the invention as defined by the following claims.

What is claimed is:

1. A composite box structure mounted on a railway car underframe to form a railway car comprising:

a pair of sidewalls, a pair of endwalls, a floor and a roof;

the sidewalls, the endwalls, the floor and the roof respectively formed as individually molded components with each component having a plurality of core members encapsulated between at least a first fiber reinforced plastic layer and a second fiber reinforced plastic layer; and the sidewalls, the endwalls, the floor and the roof attached to each other to provide a generally open interior for carrying lading within the composite box structure.

2. The composite box structure of claim 1 further comprising:

the pair of sidewalls each having a generally rectangular configuration with respective top and bottom edges and respective opposite ends;

and opening formed intermediate the opposite ends of each sidewall to provide access to the interior of the composite box structure for loading and unloading lading;

the pair of endwalls each having a substantially rectangular configuration with respective top and bottom edges and respective opposite ends;

each endwall extending between and joined to respective ends of each of the sidewalls at a sidewall/endwall corner joint;

rectangular floor having opposite side edges and ends, the floor extending between and joined to the bottom edges of the sidewalls and extending between and joined to the bottom edges of the endwalls at floor/end corner joints; and the roof mounted on the top edges of the endwalls and the sidewalls opposite from the floor.

3. The composite box structure of claim 1 further comprising:

fiber material selected from the group consisting of carbon, boron, graphite, glass and aramid; and the resin selected from the group consisting of epoxy, polyester, vinylester and vinyl.

4. The composite box structure of claim 1 wherein the core members include blocks of polymeric foam selected from the group consisting of urethane, polyurethane, styrene and polystyrene.

5. The composite box structure of claim 1 wherein the first section and the second section of each sidewall include a plurality of core members, each core member being wrapped with a fiber material, wherein the plurality of core members is sandwiched between an inner surface layer of a fiber material and an outer surface layer of a fiber material, and wherein the fiber material wrapped on the core members and the inner and outer surface layers of fiber material are impregnated with a resin to form webs of fiber reinforced plastic received between adjacent core members and fiber reinforced plastic layers on the interior and the exterior of each sidewall.

6. The composite box structure of claim 1 further comprising:

a plurality of comer connections formed between the endwalls and the sidewalls;

a plurality of comer supports formed at least in part from carbon fibers; and each of the comer supports respectively attached to corresponding interior surfaces of the endwalls and the sidewalls at the comer connections.

7. The composite box structure of claim 1 wherein the floor includes a plurality of core members, each core member being wrapped with a fiber material, wherein the plurality of core members is sandwiched between an inner surface layer of a fiber material and an outer surface layer of a fiber material, and wherein the fiber material wrapped on the core members and the inner and outer surface layers of fiber material are impregnated with a resin to form webs of fiber reinforced plastic received between adjacent core members and fiber reinforced plastic layers on the interior and the exterior of the floor.

8. The composite box structure of claim 1 wherein the roof includes a plurality of core members, each core member being wrapped with a fiber material, wherein the plurality of core members is sandwiched between an inner surface layer of a fiber material and an outer surface layer of a fiber material, and wherein the fiber material wrapped on the core members and the inner and outer surface layers of fiber material are impregnated with a resin to form webs of fiber reinforced plastic received between adjacent core members and fiber reinforced plastic layers on the interior and the exterior of the roof.

9. The composite box structure of claim 1 further comprising:

a plurality of supporting members formed at least in part from carbon fibers; and one of the supporting members attached to the respective interior surfaces at each connection between the sidewalls and the floor;

the first section and the third sections attached to and extending at an angle from the second section.

10. The composite box structure of claim 1 wherein the sidewalls further comprise a respective flange extending from the bottom edge of each sidewall for use in attaching the composite box structure with the railway car underframe.

11. The composite box structure of claim 10 wherein the flange extending from each section of the sidewalls comprises at least one layer of fiber reinforced plastic with a plurality of holes formed therein for receiving a mechanical fastener.

12. The composite box structure of claim 1 wherein the composite box structure and the railway car underframe cooperate with each other to form a railway boxcar.

13. The composite box structure of claim 1 wherein the composite box structure and the railway car underframe cooperate with each other to form a temperature controlled railway car.

14. A composite box structure mounted on a railway car underframe to form a railway boxcar comprising:

the composite box structure having a generally open interior for carrying lading;

a pair of opposite substantially rectangular sidewalls;

each sidewall having a first section and a second section, each section having a generally rectangular configuration defined in part by respective top and bottom edges and respective first and second ends;

the first section and the second section of each sidewall spaced longitudinally from each other to provide an opening for access to the interior of the box structure for loading and unloading of the lading;

a pair of opposite substantially rectangular endwalls, each endwall having top and bottom edges and first and second ends extending between and joined to a respective end of each of the sidewalls at a respective sidewall/endwall corner connection;

a generally rectangular floor extending between and joined to the bottom edges of the sidewalls and extending between and joined to the bottom edges of the endwalls at respective floor/endwall connections;

a generally rectangular roof mounted on and attached to the top edges of the endwalls and the sidewalls opposite from the floor;

the first and second sections of each sidewall, the endwalls, the floor and the roof formed as individually molded fiber reinforced composite components having a plurality of core members which are wrapped with fiber material and sandwiched between at least two layers of fiber material; and the individually molded fiber reinforced composite components attached to each to form the composite box structure.

15. The composite box structure of claim 14, further comprising:

each sidewall formed by attaching the first section with the floor and the second section with the floor;

the first end of the first section corresponding generally with the first end of the floor and the second end of the second section corresponding generally with the second end of the floor; and the second end of the first section spaced longitudinally from the first end of the second section to define in part the opening of the respective sidewall.

16. The composite box structure of claim 14 further comprising:

a pair of longitudinal recesses formed in the floor; and a track disposed within each recess for mounting a load divider assembly thereon.

17. The composite box structure of claim 14 further comprising:

a respective flange extending from the bottom edge of each first section and each second section of the sidewalls;

a plurality of holes formed in each flange and extending along the length thereof; and each opening providing a portion of means for mechanically attaching the composite box structure with the railway car underframe.

18. The composite box structure of claim 14 wherein the floor further comprises:

a plurality of generally vertical fiber reinforced plastic layers extending between the first fiber reinforced plastic layer and the second reinforced plastic layer of the floor;

the plurality of generally vertical fiber reinforced plastic layers extending between one end of the floor and the other end of the floor; and the location of the vertical fiber reinforced plastic layers selected to correspond with a respective longitudinal stringer provided by the railway car underframe.

19. The composite box structure of claim 14 wherein the floor further comprises:

a plurality of generally vertical fiber reinforced plastic layers extending between the first fiber reinforced plastic layer and the second reinforced plastic layer of the floor; and the plurality of generally vertical fiber reinforced plastic layers extending generally transverse to a plurality of longitudinal stringers provided by the railway car underframe.

20. A composite box structure mounted on a railway car underframe to form a temperature controlled railway car comprising:

the composite box structure having a generally open interior for carrying lading;

a pair of opposite substantially rectangular sidewalls, each sidewall having top and bottom edges and opposite ends;

an opening formed intermediate the opposite ends of each sidewall to provide access to the interior of the composite box structure for loading and unloading lading;

a pair of opposite substantially rectangular endwalls, each endwall having top and bottom edges and opposite ends;

each endwall extending between and joined to respective ends of each of the sidewalls at a sidewall/endwall comer joint;

a rectangular floor having opposite side edges and ends, the floor extending between and joined to the bottom edges of the sidewalls and extending between and joined to the bottom edges of the endwalls at floor/end corner joints;

a substantially rectangular roof mounted on the top edges of the endwalls and the sidewalls opposite from the floor;

the sidewalls, the endwalls, the floor and the roof respectively formed as individually molded components with a plurality of core members encapsulated between at least a first fiber reinforced plastic layer and a second fiber reinforced plastic layer; and a temperature control system for maintaining the interior of the composite box structure within a desired temperature range.

21. The composite box structure of claim 20 wherein the temperature control system further comprises:

an opening formed in at least one endwall; and a refrigeration unit mounted within the opening of the endwall to supply cool air to the interior portion of the composite box structure.

22. The composite box structure of claim 20 wherein the temperature control system further comprises an airflow management system to regulate and distribute the flow of air within the interior portion of the composite box structure.

23. The composite box structure of claim 20 further comprising:

a first barrier formed within the interior portion of the composite box structure; and the first barrier extending between the sidewalls and spaced from one of the endwalls to allow airflow between the barrier and the one endwall.

24. The composite box structure of claim 20 further comprising:
- a second barrier formed within the interior portion of the composite box structure; and
- the second barrier extending between the sidewalls and spaced from the other endwall to allow airflow between the second barrier and the other endwall.

25. The composite box structure of claim 20 wherein the temperature control system further comprises:
- an opening formed in at least one endwall;
- a refrigeration unit mounted within the opening of the endwall to supply cool air to the interior portion of the composite box structure; and
- a platform mounted on the exterior of the endwall adjacent to the refrigeration unit to provide access to the refrigeration unit.

26. The composite box structure of claim 20 wherein the temperature controlled system further comprises a fuel supply tank secured within a portion of the railway car underframe.

27. The composite box structure of claim 20 herein each sidewall further comprises:
- a first section and a second section, each section having a generally rectangular configuration; and
- the first section and the second section of each sidewall spaced longitudinally with each other to define in part the opening in the respective sidewall.

28. A composite box structure mounted on a railway car underframe to form a railway car comprising:
- a pair of sidewalls, a pair of endwalls, a floor and a roof;
- the sidewalls, the endwalls, the floor and the roof respectively formed as individual components and attached to each other to provide a generally open interior for carrying lading within the composite box structure;
- at least one of the individual components having a plurality of core members encapsulated between at least a first fiber reinforced plastic layer and a second fiber reinforced plastic layer; and
- at least one of the individual components formed in part from materials selected from the group consisting of wood, steel alloys and aluminum alloys.

29. The composite box structure of claim 28 further comprising at least one of the individual components formed in part from material selected from the group consisting essentially of wood, steel alloys and aluminum alloys.

30. The composite box structure of claim 28 further comprising:
- the floor and the roof formed as individual components having a plurality of core members encapsulated between at least a first fiber reinforced plastic layer and a second fiber reinforced plastic layer; and
- the sidewalls and the endwalls formed from materials selected from the group consisting of wood, steel alloys and aluminum alloys.

* * * * *